United States Patent
Altonji et al.

(10) Patent No.: US 11,014,581 B2
(45) Date of Patent: May 25, 2021

(54) VEHICLE ENGINE CONTROL SYSTEM

(71) Applicant: General Electric Company, Schenectady, NY (US)

(72) Inventors: Michael P. Altonji, Erie, PA (US); Jesse A. Brigden, Erie, PA (US); Todd Hayden, Prospect, PA (US); Paul Gerard Nistler, Arvada, CO (US); Mark Douglas Smith, Saint Johns, FL (US); Neeraj Agrawal, Bangalore (IN); Glenn Shaffer, Lawrence Park, PA (US); David Joseph Schroeck, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 87 days.

(21) Appl. No.: 16/253,055

(22) Filed: Jan. 21, 2019

(65) Prior Publication Data

US 2019/0152495 A1 May 23, 2019

Related U.S. Application Data

(63) Continuation-in-part of application No. 16/134,918, filed on Sep. 18, 2018, now Pat. No. 10,661,816, and
(Continued)

(51) Int. Cl.
*B61C 5/00* (2006.01)
*F02D 1/16* (2006.01)
(Continued)

(52) U.S. Cl.
CPC ............ *B61C 5/00* (2013.01); *B61C 17/12* (2013.01); *B61L 15/0018* (2013.01); *F02D 1/16* (2013.01);
(Continued)

(58) Field of Classification Search
CPC ....... B61C 17/12; B61C 5/00; B61L 15/0018; B61L 15/0027; F02D 1/16;
(Continued)

(56) References Cited

U.S. PATENT DOCUMENTS 6,889,133 B2 * 5/2005 Daniel .................... F02B 75/22
  701/114
9,488,123 B2 * 11/2016 Ito ....................... F02D 41/1456
(Continued)

*Primary Examiner* — Carl C Staubach
(74) *Attorney, Agent, or Firm* — Philip S. Hof; The Small Patent Law Group, LLC

(57) ABSTRACT

A locomotive engine control system includes one or more processors operably connected to fuel supply devices. The fuel supply devices are configured to supply fuel into different corresponding cylinders of an engine. The one or more processors are configured to monitor a fuel quantity injected into the cylinders of the engine before and after communication of an overfuel control signal. The overfuel control signal commands the fuel supply device corresponding to a first cylinder of the cylinders to supply excess fuel into the first cylinder. Responsive to the fuel quantity that is monitored not decreasing after the communication of the overfuel control signal, the one or more processors are configured to determine that the fuel supply device corresponding to the first cylinder is defective, and may generate one or more control signals indicative of the fuel supply device corresponding to the first cylinder being defective.

20 Claims, 13 Drawing Sheets

Related U.S. Application Data a continuation-in-part of application No. 15/949,375, filed on Apr. 10, 2018.

(60) Provisional application No. 62/689,304, filed on Jun. 25, 2018, provisional application No. 62/491,840, filed on Apr. 28, 2017.

(51) Int. Cl.
| | | |
|---|---|---|
| *B61L 15/00* | (2006.01) | |
| *F02D 41/22* | (2006.01) | |
| *B61C 17/12* | (2006.01) | |
| *F02D 29/06* | (2006.01) | |
| *F02D 41/00* | (2006.01) | |
| *F02D 1/00* | (2006.01) | |

(52) U.S. Cl.
CPC ........... *F02D 29/06* (2013.01); *F02D 41/008* (2013.01); *F02D 41/221* (2013.01); *F02D 2001/0085* (2013.01); *F02D 2200/0602* (2013.01); *F02D 2200/0606* (2013.01); *F02D 2200/0618* (2013.01)

(58) Field of Classification Search
CPC ..... F02D 2001/0085; F02D 2200/0602; F02D 2200/0606; F02D 2200/0618; F02D 29/06; F02D 41/008; F02D 41/221; Y02T 30/00

See application file for complete search history.

(56) References Cited

U.S. PATENT DOCUMENTS

| | | | |
|---|---|---|---|
| 9,835,104 B2* | 12/2017 | Okazaki | F02D 41/1495 |
| 10,215,115 B1* | 2/2019 | Ranga | F02D 41/0085 |
| 2006/0266332 A1* | 11/2006 | Kloos | F02D 41/008 |
| | | | 123/446 |
| 2015/0114376 A1* | 4/2015 | Suzuki | F02D 41/22 |
| | | | 123/704 |
| 2016/0333807 A1* | 11/2016 | Pathan | F02D 19/0623 |
| 2018/0238258 A1* | 8/2018 | Nakamura | F02D 41/025 |
| 2018/0314255 A1* | 11/2018 | Nistler | G01M 17/08 |
| 2019/0179314 A1* | 6/2019 | Nistler | G01M 17/007 |

* cited by examiner

VEHICLE ENGINE CONTROL SYSTEM

CROSS-REFERENCE TO RELATED APPLICATIONS

This application claims priority to U.S. Provisional Application No. 62/689,304, filed 25 Jun. 2018, is a continuation-in-part of U.S. patent application Ser. No. 16/134,918, filed 18 Sep. 2018, and is a continuation-in-part of U.S. patent application Ser. No. 15/949,375, filed 10 Apr. 2018. U.S. patent application Ser. No. 15/949,375 claims priority to U.S. Provisional Application No. 62/491,840, filed 28 Apr. 2017. The entire disclosures of these applications are incorporated herein by reference.

FIELD

The subject matter described herein generally relates to engine fuel supply devices.

BACKGROUND

Devices that supply fuel to the cylinders of engines may become faulty or defective, which impairs the performance of the engine, among other negative consequences. For example, a fuel injector may become stuck in the closed position, preventing the fuel injector from spraying fuel into the corresponding cylinder. As a result, the cylinder associated with the defective fuel injector may not function to supply power for turning the crank shaft. Having one or more defective fuel injectors (or other fuel supply devices) impairs the engine performance by reducing the power output capability, reducing fuel efficiency, and/or increasing emissions (e.g., smoke).

Although the side effects of having a defective fuel supply device, such as reduced power output and increased emissions, may enable an operator to suspect the presence of one or more faulty fuel supply devices, there are no known objective tools or tests for reliably identifying which of the fuel supply devices are defective and which of the fuel supply devices are healthy (e.g., properly functioning). For example, some operators try to distinguish faulty fuel injectors by commanding the injection of more fuel than required into one of the cylinders at a time, and listening for anomalies in the resulting sounds of the combustion events within the cylinders. But, this audible test is subjective and unreliable, and mistakes may lead to an operator replacing healthy fuel injectors and/or not replacing faulty fuel injectors. To avoid such errors, operators frequently replace all fuel injectors of an engine (and optionally other associated devices, such as fuel pumps, distributors, valves, lines, and the like), to ensure that all fuel supply devices are properly functioning. This can be wasteful and costly because healthy components can end up being discarded and replaced.

SUMMARY

In one or more embodiments of the present disclosure, a control system is provided that includes one or more processors operably connected to fuel supply devices. The fuel supply devices are configured to supply fuel into different corresponding cylinders of an engine. The one or more processors are configured to monitor a fuel quantity injected into the cylinders of the engine before and after communication of an overfuel control signal. The overfuel control signal commands the fuel supply device corresponding to a first cylinder of the cylinders to supply excess fuel into the first cylinder. Responsive to the fuel quantity that is monitored not decreasing during a designated time period after the communication of the overfuel control signal, (i) the one or more processors are configured to determine that the fuel supply device corresponding to the first cylinder is defective, and/or (ii) the one or more processors are configured to generate one or more control signals indicative of the fuel supply device corresponding to the first cylinder being defective. The one or more control signals are configured to control the engine or another system operably coupled to the engine.

In one or more embodiments, a system is provided that includes an engine and one or more processors. The engine has plural fuel supply devices configured to supply fuel into different corresponding cylinders of the engine. The one or more processors are operably connected to the fuel supply devices and are configured to communicate an overfuel control signal to determine whether the fuel supply device corresponding to a first cylinder of the cylinders is properly functioning. The overfuel control signal commands the fuel supply device corresponding to the first cylinder to supply excess fuel into the first cylinder. The one or more processors are configured to monitor a fuel quantity injected into the cylinders of the engine before and after communication of the overfuel control signal. The one or more processors are configured, responsive to the fuel quantity that is monitored not decreasing during a designated time period after the communication of the overfuel control signal, to generate one or more control signals indicative of the fuel supply device corresponding to the first cylinder being defective. The one or more control signals are configured to control the engine or another system operably coupled to the engine.

In one or more embodiments, a method is provided that includes monitoring, via one or more processors, a fuel quantity injected into cylinders of an engine before and after communication of an overfuel control signal. The overfuel control signal commands a fuel supply device that corresponding to a first cylinder of the cylinders to supply excess fuel into the first cylinder. Responsive to the fuel quantity that is monitored not decreasing after the communication of the overfuel control signal, the method includes determining that the fuel supply device corresponding to the first cylinder is defective.

In one or more embodiments, a control system is provided that includes one or more processors operably connected to fuel supply devices. The fuel supply devices are configured to supply fuel into different corresponding cylinders of an engine. The one or more processors are configured to increase an injection duration at which a first fuel supply device is in an open state during a first time period to overfuel a first cylinder of the engine. The one or more processors are configured to measure injection durations at which the fuel supply devices other than the first fuel supply device are in the open state during the first time period in response to the first fuel supply device overfueling the first cylinder. Responsive to the injection durations of the fuel supply devices other than the first fuel supply device not decreasing beyond a designated noise threshold, the one or more processors are configured to determine that the first fuel supply device is defective.

In one or more embodiments, a system is provided that includes an engine and one or more processors. The engine has plural fuel supply devices configured to supply fuel into different corresponding cylinders of the engine. The one or more processors are operably connected to the fuel supply devices. The one or more processors are configured to monitor an engine speed of the engine and to control, via the fuel supply devices, a fuel quantity injected into the cylinders of the engine to maintain the engine speed at a designated speed. The one or more processors receive or generate a fuel modification control signal that commands the fuel supply device corresponding to a first cylinder of the cylinders to supply one or more of an excess amount of fuel into the first cylinder that is greater than a designated baseline amount during a designated time period or a reduced amount of fuel into the first cylinder that is less than the designated baseline amount during the designated time period. Responsive to detecting that the engine speed does not vary beyond a designated threshold range within a designated time period after the fuel modification control signal, the one or more processors are configured to generate one or more control signals indicative of the fuel supply device corresponding to the first cylinder being defective.

BRIEF DESCRIPTION OF THE DRAWINGS

Reference is now made briefly to the accompanying drawings, in which.

DETAILED DESCRIPTION

Figure 1:
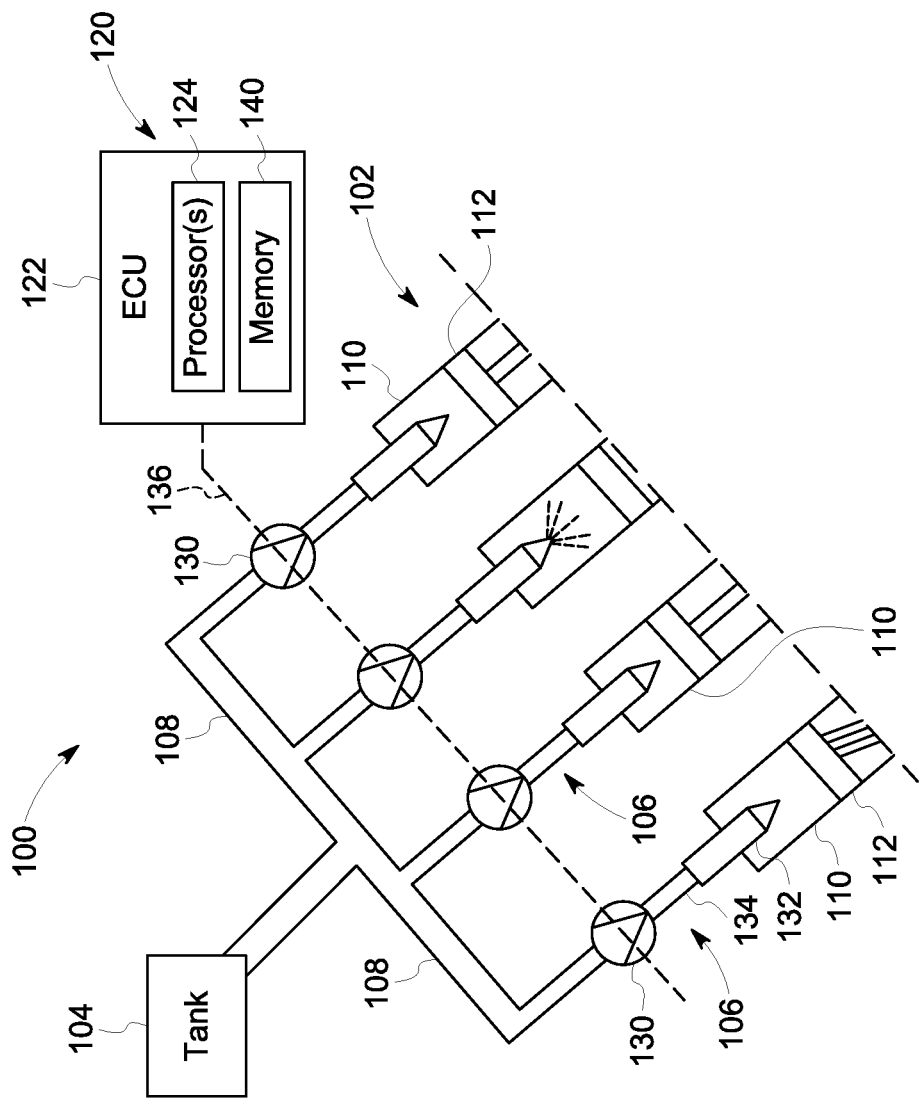
FIG. 1 is a schematic block diagram of a fuel system and a control system according to an embodiment of the present disclosure.

Reference will be made below in detail to example embodiments of the inventive subject matter, examples of which are illustrated in the accompanying drawings. Wherever possible, the same reference numerals used throughout the drawings refer to the same or like parts.

At least one technical effect provided by one or more embodiments described herein is increased accuracy in determining which specific fuel supply devices of an engine are faulty or defective such that healthy devices are not replaced. This accuracy can be increased relative to known subjective methods that include listening for anomalies in the sound of combustion events within cylinders. As a consequence of accurately detecting which fuel supply devices are faulty, costs for parts and maintenance can be reduced by replacing only the fuel supply devices that are defective, extending the lifetime of properly functioning fuel supply devices. Replacing the defective fuel supply devices in an engine allows the engine to operate with a full set of properly functioning fuel supply devices, which may increase engine performance by increasing power output capability, improving fuel efficiency, reducing emissions, or the like (relative to the same engine operating with one or more defective fuel supply devices).

FIG. 1 is a schematic block diagram of a fuel system 100 according to an embodiment of the present disclosure. The fuel system 100 includes an engine 102, a fuel tank 104, multiple fuel supply devices 106, and fuel supply lines 108 that interconnect the components. The fuel system 100 supplies fuel from the fuel tank 104 to the engine 102. FIG. 1 also shows a control system 120 for controlling the flow of fuel through the fuel system 100 from the tank 104 to the engine 102.

The engine 102 includes multiple cylinders 110 that house pistons 112 therein. The only parts of the engine 102 shown in FIG. 1 are portions of four cylinders 110 of the engine 102. The four cylinders 110 shown in FIG. 1 may represent a total number of cylinders in the engine 102, or may represent a subset of the cylinders. For example, the engine 102 may have a total of six, eight, ten, twelve, or sixteen cylinders. The engine 102 is an internal combustion engine 102 that is configured to combust fuel, such as gasoline and/or diesel, within the cylinders 110.

The fuel system 100 may be onboard a vehicle, and the engine 102 may be configured to propel the vehicle. The vehicle may be an on-road vehicle (e.g., an automobile, a semi-truck, a bus, or the like), an off-highway vehicle (e.g., a mining truck, a construction vehicle, a farm tractor, or the like), a marine vessel, a rail vehicle, or the like. In an alternative embodiment, the engine 102 may not be disposed onboard a vehicle, such that the engine 102 may be installed in industrial machinery. For example, the engine 102 may be used to power a stationary generator for land-based electrical power applications (e.g., mining back-up power generation) and/or marine-based electrical power applications (e.g., offshore oil platforms).

The fuel system 100 has multiple fuel supply devices 106 that inject fuel into different corresponding cylinders 110 of the engine 102. In the illustrated embodiment, each fuel supply device 106 is a pump line nozzle assembly that includes a fuel pump 130, a fuel injector 132, and a fuel line 134 fluidly connecting the fuel pump 130 to the fuel injector 132. Each fuel supply device 106 is associated with a different one of the cylinders 110, such that four fuel supply devices 106 are depicted in FIG. 1. Optionally, fewer than four fuel supply devices 106 can be provided (including a single fuel supply device 106), or more than four fuel supply devices 106 can be provided. The fuel injector 132 extends into the corresponding cylinder 110, and has a nozzle tip that sprays fuel into the cylinder 110.

In an alternative embodiment, the fuel supply devices 106 may refer to the fuel injectors 132 and the fuel pumps 130 individually instead of collectively in the pump line nozzle assemblies. The fuel system 100 may include a single fuel pump 130 that is fluidly coupled to multiple fuel injectors 132 such that the fuel pump 130 supplies fuel into multiple cylinders 110 via the corresponding fuel injectors 132.

The control system 120 includes an engine control unit 122 ("ECU" in FIG. 1) that includes or represents one or more processors 124 (e.g., hardware circuitry that includes and/or is connected with one or more microprocessors, one or more field programmable gate arrays, and/or one or more integrated circuits). The engine control unit 122 is illustrated in FIG. 1 as a single box, but it is understood that the processors 124 of the engine control unit 122 may be distributed in multiple different units or devices. For example, some processors 124 may be located within one or more diagnostic devices or units that represent components of the engine control unit 122.

The engine control unit 122 is operably connected to the fuel supply devices 106. For example, the engine control unit 122 is communicatively connected to the fuel pumps 130 via a wired and/or wireless connection 136. The engine control unit 122 controls the flow of fuel through the fuel system 100 by selectively actuating the fuel supply devices 106 between a closed state and an open state. In the closed state, a fuel supply device 106 does not inject fuel into the corresponding cylinder 110 for combustion. For example, in the closed state, the fuel pump 130 of the fuel supply device 106 may block the flow of fuel through the pump 130 via a valve mechanism or the like. In the open state, the fuel pump 130 conveys fuel through the fuel line 134, and the fuel injector 132 sprays the fuel into the respective cylinder 110. The engine control unit 122 may selectively actuate the fuel supply devices 106 by transmitting electrical control signals to the fuel supply devices 106 that command transitioning between the open state and the closed state. The fuel supply devices 106 can transition between the open and closed states following receipt of a control signal.

In the illustrated embodiment, the engine control unit 122 is communicatively connected to the fuel pumps 130 of the fuel supply devices 106. In an alternative embodiment, the engine control unit 122 may be communicatively connected to the fuel injectors 132 instead of, or in addition to, the fuel pumps 130. For example, the fuel injectors 132 may include electrical or electromagnetic switches, such as solenoids, that open and close to allow and block, respectively, the flow of fuel through the injectors 132 based on electrical control signals received from the engine control unit 122.

The engine control unit 122 can independently control the fuel supply devices 106. For example, the engine control unit 122 can transmit control signals to different fuel supply devices 106 at different times to stagger the timing of the combustion events within the cylinders 110. The engine control unit 122 also can control the amount of fuel that is injected into each of the cylinders 110 by the associated fuel supply devices 106. As described herein, the engine control unit 122 can selectively overfuel (or underfuel) certain cylinders 110 of the engine 102 at different times during a test. Over-fueling a cylinder 110 can include supplying an excess amount of fuel into a cylinder 110. The excess amount of fuel may be relative to a normal amount of fuel injected into the cylinder 110 during normal engine 102 operation and/or relative to respective amounts of fuel injected into other cylinders 110 of the engine 102. The excess amount of fuel may be greater than an amount of fuel that can be combusted within a given cylinder during a single combustion cycle of the cylinder. The injection of excess amounts of fuel in a first cylinder 110 may cause a popping sound.

The over-fueling of the first cylinder 110 speeds up the engine 102 because additional fuel is combusted. The engine control unit 122 detects the increased engine speed and reacts by reducing the quantity of fuel supplied to the other cylinders 110 to attempt to maintain a constant, designated engine speed. The engine control unit 122 may reduce the quantity of fuel supplied to other cylinders 110 by an amount that is generally equivalent to the excess amount of fuel supplied to the first cylinder 110. The engine speed may be detected using an engine speed sensor that is operably connected to the engine control unit 122. The designated engine speed may be pre-selected by an operator, a trip plan, a regulation, or the like. For example, if the designated engine speed is 700 revolutions per minute (RPMs), and the over-fueling of the first cylinder 110 causes a detected increase to 750 RPMs, then the engine control unit 122 reduces the fuel supplied to the other cylinders to compensate for the additional power and reduce the engine speed back to 700 RPMs.

In at least one embodiment, the engine control unit 122 may overfuel one of the cylinders 110 at a time. For example, a first cylinder 110 may be overfueled by increasing the amount of fuel injected into the first cylinder 110 without over-fueling other cylinders 110 of the same engine 102. While the first cylinder 110 is overfueled, the fuel quantity supplied into the first cylinder 110 may exceed the fuel quantity supplied into each of the other cylinders 110 of the engine 102 (that are not overfueled).

Although one or more embodiments describe over-fueling the cylinders 110 by injecting excess amounts of fuel into the cylinders 110, it is recognized that the fuel system 100 also works to detect defective fuel supply devices 106 by under-fueling the cylinders 110. For example, instead of injecting an excess amount of fuel into the first cylinder 110, the fuel system 100 may inject a reduced amount of fuel into the first cylinder 110. The reduced amount of fuel may be relative to a normal amount of fuel injected into the cylinder 110 during normal engine 102 operation and/or relative to respective amounts of fuel injected into other cylinders 110 of the engine 102. If less fuel is supplied to the first cylinder 110, then the engine speed 102 would decrease due to the reduced amount of combustion. The engine control unit 122 may detect the decrease in the engine speed 102, and may compensate by increasing the fuel quantity supplied into the other cylinders 110. The fuel system 100 is operable with any attempted modification, positive or negative, in the amount of fuel supplied to the specific cylinder 110 that is tested.

In at least one embodiment, the engine control unit 122 selectively controls the amount of fuel injected into the cylinders 110 by controlling injection durations of the fuel supply devices 106. The injection duration represents an amount of time that the fuel supply device 106 is in the open state before transitioning to the closed state. The injection durations also may be referred to as pulse widths or durations, as the fuel supply devices 106 may alternate between the closed and open states at a relatively high frequency to maintain engine speed of the engine 102.

For example, each of the fuel supply devices 106 may be configured to pump the fuel at a constant flow rate. The flow rates of different fuel supply devices 106 may be approximately the same (e.g., within a designated threshold range of each other, such as flow rates that are within 1%, 5%, or 10% of each other). The engine control unit 122 can control a first fuel supply device 106 to supply a greater amount of fuel in the associated cylinder 110 than an amount of fuel supplied into an adjacent cylinder 110 by a second fuel supply device 106 by controlling the first fuel supply device 106 to have a greater injection duration than the injection duration of the second fuel supply device 106.

The engine control unit 122 controls the injection durations of the fuel supply devices 106 by transmitting the control signals to open (e.g., to allow fuel injection) and close (e.g., to block fuel injection) the fuel supply devices 106. Additionally or alternatively, the engine control unit 122 may control the quantity of fuel injected into the corresponding cylinders 110 by varying the flow rates at which fuel is injected into the cylinders 110. For example, the engine control unit 122 may control the pumps 130 to increase or decrease the fuel flow rates supplied to the fuel injectors 132.

The engine control unit 122 optionally also includes a memory storage device 140, which is a tangible and non-transitory computer readable medium referred to herein as "memory". The engine control unit 122 includes and/or represents one or more hardware circuits or circuitry that include, are connected with, or that both include and are connected with one or more processors 124, controllers, and/or other hardware logic-based devices. The engine control unit 122 may include a central processing unit (CPU), one or more microprocessors, a graphics processing unit (GPU), or any other electronic component capable of processing inputted data according to specific logical instructions. For example, the engine control unit 122 (e.g., the one or more processors 124 thereof) may execute instructions (e.g., software) stored on the memory 140 or stored on another tangible and non-transitory computer readable medium. The memory 140 may include or represent a flash memory, RAM, ROM, EEPROM, and/or the like. The memory 140 may store a look-up table that correlates injection durations with quantities of fuel based on historical data, as described in more detail herein. In an alternative embodiment, the memory 140 may be discrete and separate from the engine control unit 122.

It is understood that the components depicted in FIG. 1 are for descriptive purposes, and the fuel system 100 may include additional and/or different components in an actual application, such as fuel manifolds, fuel filters, fuel distributors, and/or the like. Furthermore, the components may be arranged differently than the arrangement shown in FIG. 1.

FIGS. 2 through 5 illustrate graphs 200 showing fuel quantities injected into different corresponding cylinders of the engine 102 (shown in FIG. 1) during different time periods or intervals according to an embodiment. Vertical axes 202 of the graphs 200 represent fuel quantity or amount, such as a volumetric quantity, mass, or the like, of fuel that is injected into the cylinders. The fuel quantities may represent amounts of fuel injected into the individual cylinders over a designated time period, such as one injection cycle, a designated number of injection cycles, or a selected amount of time. Horizontal axes 204 of the graphs 200 represent different cylinders of the engine 102. In the illustrated embodiment, the six cylinders represent all of the cylinders in the engine 102. It is understood that the engine 102 may include more or less than six cylinders in other embodiments. Several bars 206, 207, 208, 209, 210, 211 represent the amount of fuel injected into each of the cylinders during different time periods or intervals. The cylinders in the graphs 200 are labeled "1", "2", "3", "4", "5", "6", and are referred to herein as "first cylinder", "second cylinder", "third cylinder", "fourth cylinder", "fifth cylinder", and "sixth cylinder", such that the first cylinder corresponds to the bar 206 labeled "1", the second cylinder corresponds to the bar 207 labeled "2", and so on.

Figure 2:
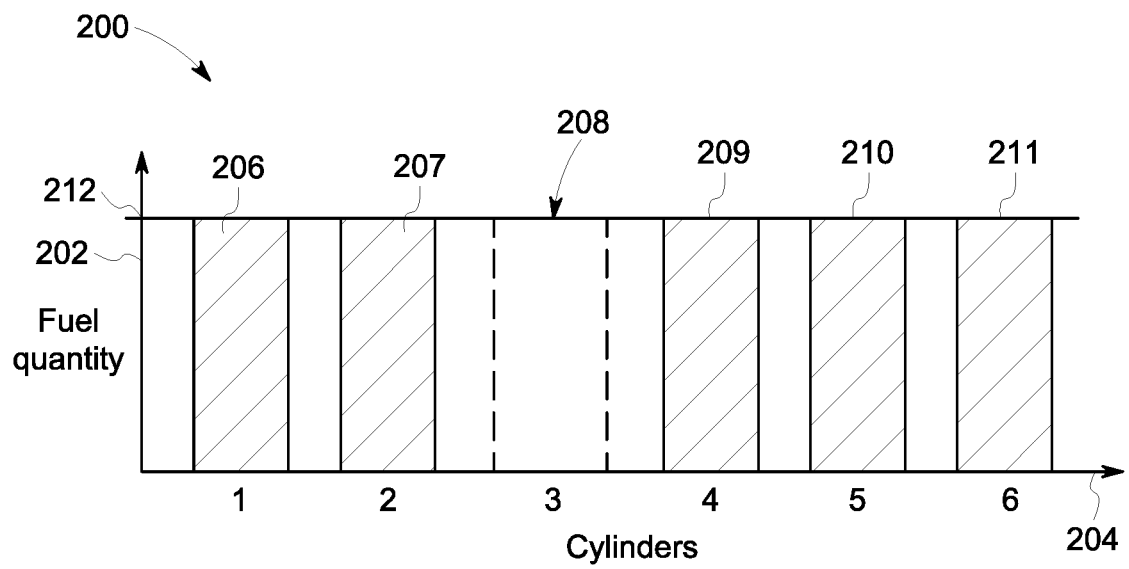
FIG. 2 is a graph showing fuel quantities injected into cylinders of engine during a first time period according to an embodiment.

FIG. 2 is a graph 200 showing the fuel quantities injected into the cylinders of the engine 102 (shown in FIG. 1) during a first time period. During the first time period, the engine 102 may be operating normally. For example, the engine 102 may be idling (e.g., in an idle condition). The engine control unit 122 (shown in FIG. 1) may control or command the fuel supply devices (shown in FIG. 1) to supply approximately equal amounts of fuel (e.g., within a designated threshold range of 1%, 5%, or 10% of each other) into each of the six cylinders. The third cylinder has a defective or faulty fuel supply device 106. The defective fuel supply device 106 may be an injector 132 or a fuel pump 130 that is "stuck" in the closed state, a plugged fuel line 134, or the like, such that the fuel supply device 106 is unable to supply fuel into the third cylinder. As a result, no fuel is actually injected into the third cylinder during the first time period. The graph 200 in FIG. 2 shows a phantom bar 208 that represents an expected fuel quantity based on the control signals generated by the engine control unit 122.

In one or more embodiments herein, the engine control unit 122 is configured to determine whether any of the cylinders 110 of the engine 102 has a defective fuel supply device 106 and, optionally, to identify which of the cylinders 110 has the defective fuel supply device 106. For example, the control system 120 shown in FIG. 1 may not have, or may not be in communication with, sensors disposed in each of the cylinders 110 that can measure the actual fuel quantities injected into the cylinders 110. Although no fuel is injected into the third cylinder in FIG. 2, there may be no sensor that monitors actual fuel input into the third cylinder and communicates such information to the engine control unit 122. The engine control unit 122 is therefore not aware during the first time period shown in FIG. 2 that the fuel supply device 106 associated with the third cylinder is defective.

The engine control unit 122 may automatically control and adjust the injection durations of the fuel supply devices 106 within a set limit such that the collective quantity of fuel injected into the engine 102 during a given time period maintains a specific, designated engine speed. The designated engine speed may be determined by a human operator, a trip plan, a regulation, or the like. The engine speed may be monitored by a sensor, such as a crankshaft position sensor, which is operably connected to the engine control unit 122 via a wired or wireless connection. The collective quantity of fuel in FIG. 2 is the sum of the individual quantities injected into the first cylinder, the second cylinder, the fourth cylinder, the fifth cylinder, and the sixth cylinder because no fuel is injected into the third cylinder due to the defective fuel supply device 106. In FIG. 2, each of the fuel quantities of the cylinders other than the third cylinder is at a baseline quantity 212. The baseline quantity 212 is used for reference herein. The baseline quantity 212 may represent an amount of fuel injected into each individual fuel cylinder 110 during normal operation of the engine while the engine is operating at a designated speed. The fuel quantities shown in FIGS. 2-5 For example, during a time period in which no cylinders are being overfueled (or underfueled), such as the first time period shown in FIG. 2, each of the functioning cylinders may be supplied with the baseline quantity 212 of fuel.

In one or more embodiments described herein, the engine control unit 122 initiates a test to determine if any of the fuel supply devices 106 are defective. The test is a fuel control procedure in which the engine control unit 122 attempts to modify the amount of fuel supplied to one cylinder at a time during different time periods or intervals. The modification may include over-fueling a specific cylinder 110 that is the subject of the test or under-fueling the subject cylinder 110. The test procedure may be stored in the memory 140 (shown in FIG. 1) and accessed by the one or more processors 124 (shown in FIG. 1) of the engine control unit 122.

Figure 3:
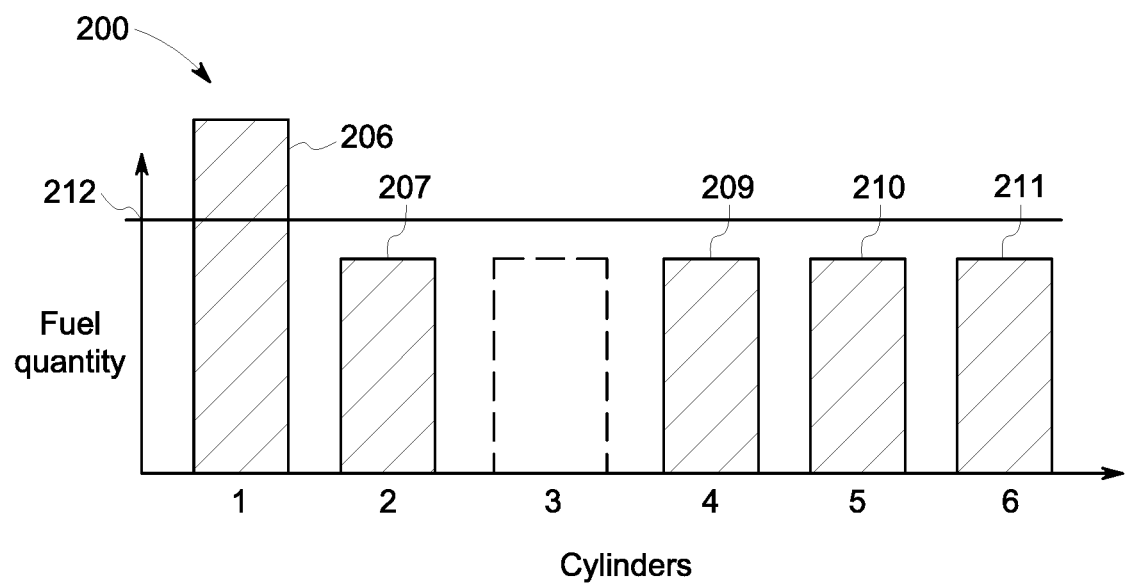
FIG. 3 is a graph showing fuel quantities injected into cylinders of engine during a subsequent, second time period in which a first cylinder is overfueled according to an embodiment.

FIG. 3 shows the graph 200 during a second time period in which the first cylinder is overfueled. The engine control unit 122 may initiate the test by generating a fuel modification control signal. The fuel modification control signal commands the fuel supply device 106 connected to the first cylinder to change the amount of fuel supplied into the first cylinder beyond the baseline quantity 212 for a designated period of time. In the illustrated embodiment, the fuel modification control signal represents an overfuel control signal that commands the fuel supply device 106 to increase the amount of fuel supplied into the first cylinder beyond the baseline quantity 212. Alternatively, the fuel modification control signal may represent an underfuel control signal that commands the fuel supply device 106 to decrease or reduce the amount of fuel supplied into the first cylinder. In an alternative embodiment, instead of the control signal being generated by the engine control unit 122, the fuel modification control signal may be generated remote from the engine control unit 122, such as by an input device utilized by an operator.

During the test according to the illustrated embodiment, the cylinders of the engine 102 are tested one at a time. Each cylinder is tested by supplying excess fuel into the specific cylinder. The engine control unit 122 is configured to observe the effects that the over-fueling has on the fuel quantities within the other cylinders that are not overfueled. For example, during the time period in which the first cylinder is tested (e.g., overfueled), as shown in FIG. 3, the engine control unit 122 monitors the fuel quantities within the second, third, fourth, fifth, and sixth cylinders. As described above, however, the engine control unit 122 may not be able to monitor the fuel quantities of the cylinders directly due to a lack of sensors and/or a lack of communication with sensors in and around the cylinders. In one or more embodiments, the engine control unit 122 monitors the engine speed during a designated time period following the attempted over-fueling of the individual cylinders. The over-fueling is referred to as attempted because if the fuel supply device is defective, then no actual over-fueling may occur.

If the attempted over-fueling causes an increase in the engine speed above the designated speed of the engine, then the engine control unit 122 may reduce the fuel quantities of the non-tested cylinders to compensate and reduce the engine speed back to the designated speed. The engine control unit 122 may reduce the fuel quantities of the non-tested cylinders by reducing the injection durations at which the fuel supply devices 106 inject fuel into the non-tested cylinders.

As shown in FIG. 3, in response to the overfuel control signal that commands over-fueling the first cylinder, the quantity of fuel 206 injected into the first cylinder increases relative to the baseline quantity 212. The engine control unit 122 may increase the quantity of fuel supplied into the first cylinder by increasing the injection duration at which the fuel supply device 106 injects fuel into the first cylinder relative to the injector duration prior to the overfuel control signal. The fuel supply device 106 connected to the first cylinder is properly functioning, so the quantity of fuel 206 in the first cylinder actually increases to a level greater than the baseline quantity 212.

In response to the increased amount of fuel supplied to the first cylinder, the engine speed increases. To compensate for the increased combustion and reduce the engine speed back to the designated speed, the engine control unit 122 reduces the quantities of fuel 207, 209, 210, 211 injected into each of the non-tested cylinders (e.g., the second, fourth, fifth, and sixth cylinders) relative to the baseline quantity 212. For example, the collective quantity of fuel supplied to the engine 102 may be constant, so increasing the percentage of fuel supplied to the first cylinder results in a decreased percentage of fuel supplied into each of the other cylinders (with properly functioning fuel supply devices 106) to maintain the collective quantity at the given amount. The collective quantity of fuel supplied into the engine 102 in a given time period may be constant due to the engine control unit 122 attempting to maintain a specific, designated engine speed (e.g., RPM). To maintain the specific engine speed, an increase in fuel supplied to one cylinder is balanced by supplying less fuel to one or more other cylinders.

As shown in FIG. 3, the result of over-fueling the first cylinder causes the fuel supplied to the other cylinders to decrease to respective levels below the baseline quantity 212. As described above, however, the engine control unit 122 may not be able to directly monitor the fuel quantities shown in FIGS. 2 through 5 via sensors or the like. The graphs 200 in FIGS. 2 through 5 depict the actual fuel quantities within the cylinders, but the engine control unit 122 may not have access to such information. In one or more embodiments, the engine control unit 122 detects the response of the other, non-tested cylinders to an overfuel control signal by monitoring and/or measuring the injection durations of the fuel supply devices associated with the non-tested cylinders, and/or by monitoring the speed of the engine.

For example, one way to determine that the fuel quantities of the non-tested cylinders decrease is by detecting that the engine speed temporarily increased (due to the excess amount of fuel injected into the first cylinder) and then subsequently decreased back to the designated engine speed. The subsequent decrease in engine speed indicates that less fuel was supplied into the other, non-tested cylinders. Another way to determine that the fuel quantities of the non-tested cylinders decreased below the baseline quantity 212 is by detecting a reduction in the injection durations during which the fuel supply devices are in the open state to supply fuel into the non-tested cylinders. For example, in response to an attempted over-fueling of the first cylinder, if the injection durations of the fuel supply devices corresponding to the non-tested cylinders shorten for a designated time period (e.g., one injection cycle, multiple injection cycles, or a defined amount of time) relative to the injection durations during normal operation, then this indicates a decrease in the monitored fuel quantities of the non-tested cylinders.

The decrease in the fuel quantities corresponding to the non-tested cylinders indicates that the fuel supply device 106 corresponding to the first cylinder is properly functioning.

After the second time period, the engine control unit 122 may stop over-fueling the first cylinder. The injection durations of the fuel supply devices 106 may level out again such that the fuel quantities return to the baseline quantity 212 levels shown in FIG. 2.

Figure 4:
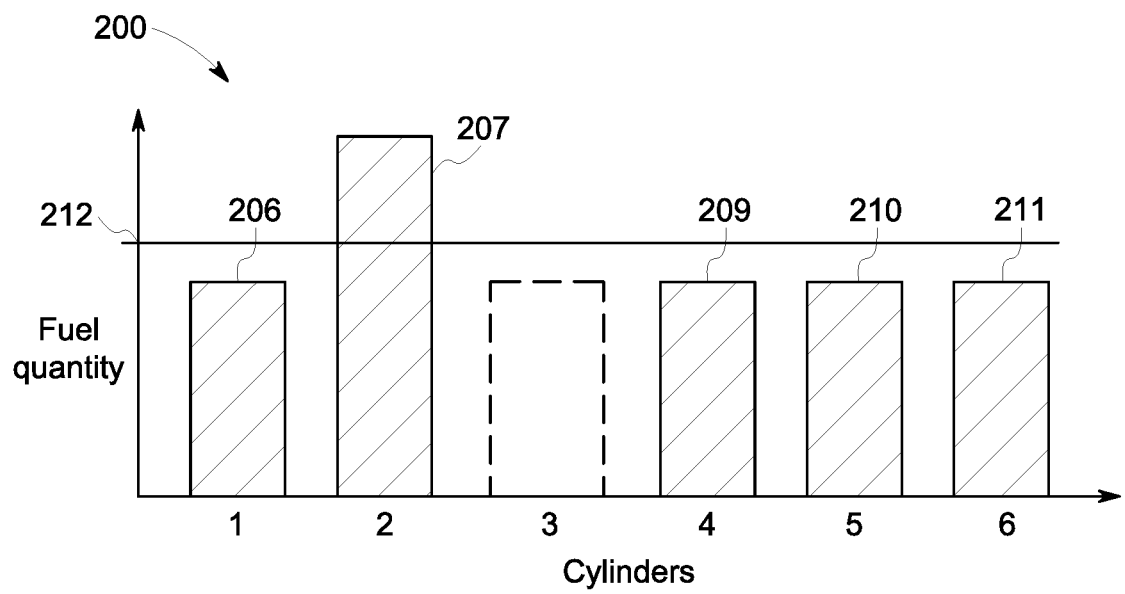
FIG. 4 is a graph showing fuel quantities injected into cylinders of engine during a subsequent, third time period in which the second cylinder is overfueled according to an embodiment.

FIG. 4 shows the graph 200 during a third time period in which the second cylinder is overfueled. FIG. 4 is similar to FIG. 3, except for a different cylinder that is being overfueled. The engine control unit 122 may receive or generate an overfuel control signal that controls the fuel supply device 106 connected to the second cylinder to increase the injection duration such that an excess amount of fuel is supplied to the second cylinder. As shown in FIG. 4, the quantity of fuel 207 in the second cylinder does increase, which automatically causes the respective quantities of fuel 206, 209, 210, 211 in the first, fourth, fifth, and sixth cylinders to decrease below the baseline quantity 212 to compensate for the excess fuel in the second cylinder to maintain the collective quantity of fuel at a given value. This compensatory response in which the amount of fuel supplied into the other, non-tested cylinders decreases indicates that the fuel supply device 106 corresponding to the second cylinder is properly functioning. After the third time period, the engine control unit 122 decreases the injection duration of the fuel supply device connected to the second cylinder to stop over-fueling the second cylinder, and the fuel quantities in the cylinders return to the levels shown in FIG. 2.

Figure 5:
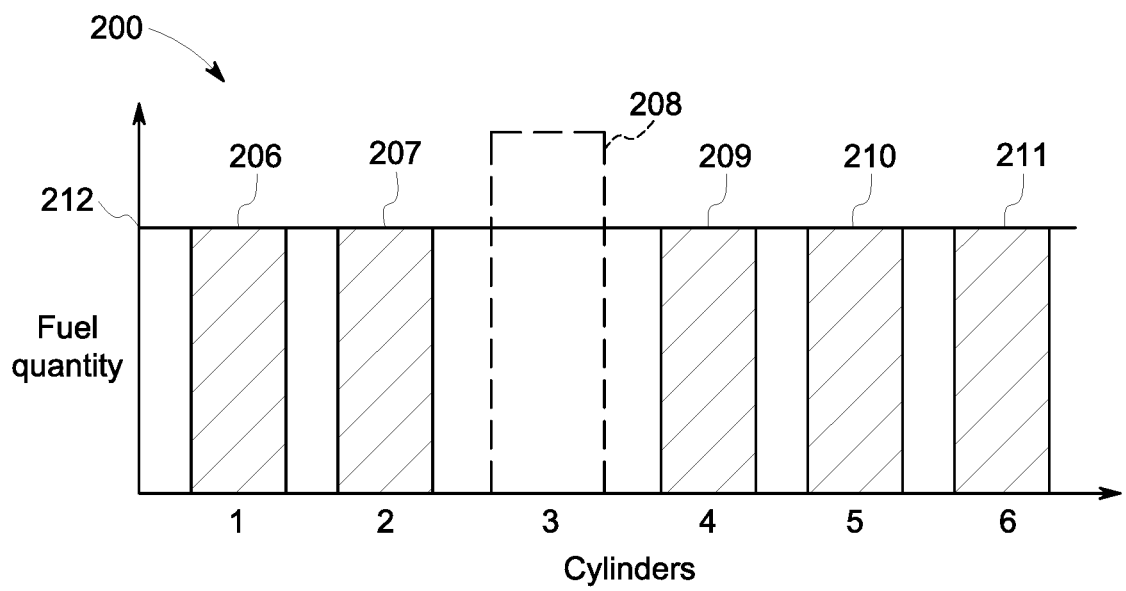
FIG. 5 is a graph showing fuel quantities injected into cylinders of engine during a subsequent, fourth time period in which a third cylinder is commanded to be overfueled according to an embodiment.

FIG. 5 shows the graph 200 during a fourth time period in which the third cylinder is commanded to be overfueled. The engine control unit 122 may receive or generate an overfuel control signal that controls the fuel supply device 106 connected to the third cylinder to increase the injection duration such that an excess amount of fuel is supplied to the third cylinder. The fuel supply device 106 is faulty or defective, so the fuel supply device 106 does not actually supply an excess amount of fuel into the third cylinder. The fault may prevent the fuel supply device 106 from supplying any fuel into the third cylinder, as shown by the phantom bar 208 in FIG. 5. Although the engine control unit 122 may not be able to directly monitor the amount of fuel injected into the third cylinder, the engine control unit 122 is configured to monitor and/or measure the effect that such an overfuel control signal has on the injection durations of the fuel supply devices 106 associated with the cylinders other than the third cylinder.

Due to the defective fuel supply device, an excess amount of fuel is not supplied into the third cylinder, so the engine speed does not increase above the designated engine speed. Because there is no change in the engine speed, there is no monitored change in the quantities of fuel supplied into the other, non-tested cylinders (e.g., the first, second, fourth, fifth, and sixth cylinders). For example, the engine control unit 122 does not decrease the fuel quantities supplied to the non-tested cylinders to compensate for excess fuel supplied to the third cylinder that is tested. As shown in FIG. 5, the quantities of fuel 206, 207, 209, 210, 211 supplied into the cylinders other than the third cylinder remain at the baseline quantity 212 both before and after the communication of the overfuel control signal to overfuel the third cylinder. The quantities of fuel supplied into the cylinders other than the third cylinder do not decrease by more than a designated noise threshold, which is a non-zero threshold. The designated noise threshold may be 1%, 2%, 5% or the like of the baseline quantity 212. For example, if the noise threshold is 5%, and the quantities of fuel supplied into the cylinders other than the third cylinder decrease by 2% of the baseline quantity 212 after communication of the overfuel control signal, then the quantities of fuel do not decrease by more than the noise threshold.

The engine control unit 122 is able to determine that fuel quantities supplied to the non-tested cylinders do not change, or at least do not change more than a designated non-zero noise threshold, by monitoring the injection durations of the fuel supply devices 106 associated with the non-tested cylinders. For example, responsive to the overfuel control signal to overfuel the third cylinder, the engine control unit 122 expects to observe a decrease in the injection durations of the fuel supply devices 106 associated with the other (e.g., non-tested) cylinders, as the reduction in injection duration reduces the amount or quantity of fuel that is injected into the other cylinders. But, since there is no change in the quantity of fuel injected into the other cylinders, the engine control unit 122 observes no change in the injection durations of the fuel supply devices 106 associated with these other cylinders. Based on this observation, the engine control unit 122 can determine or detect that the fuel supply device 106 associated with the third cylinder is defective.

The injection durations of the fuel supply devices 106 connected to the non-tested cylinders are variables, and are dependent on the injection duration of the fuel supply device 106 connected to the overfueled cylinder as well as the collective quantity of fuel injected into the engine during a given time period (which may be constant or known). For example, because there is a known total amount of fuel to inject into the engine, increasing the injection duration of one fuel supply device to overfuel one of the cylinders may automatically cause the injection durations of the other fuel supply devices to decrease to supply less fuel in to the non-tested cylinders. The engine control unit 122 may measure or monitor the variable injection durations by monitoring the time in which the fuel supply devices 106 are in the open state.

The engine control unit 122 may be configured to continue the pop test by sequentially over-fueling the fourth cylinder, the fifth cylinder, and the sixth cylinder, and observing the effects of the commanded over-fueling on the other, non-tested cylinders. The engine control unit 122 may indirectly monitor the effect of such over-fueling on the amounts of fuel supplied into the other, non-tested cylinders by detecting deviations in the injection durations of the fuel supply devices 106 connected to the non-tested cylinders.

After completing the process described above and determining that the fuel supply device connected to at least one of the cylinders is defective, the engine control unit 122 may automatically generate a control signal to implement a responsive action. The control signal may be generated based on programmed instructions stored in the memory 140 (shown in FIG. 1) or another storage device accessible by the engine control unit 122. In an embodiment, the engine control unit 122 may generate a control signal to schedule maintenance for repairing and/or replacing the fuel supply device (or devices) 106 determined to be defective. According to the example described in FIGS. 2 through 5, the control signal may schedule maintenance for repairing and/or replacing the fuel supply device 106 that corresponds to the third cylinder of the engine 102. The control signal may indicate that the fuel supply devices 106 corresponding to the other cylinders of the engine 102 are healthy (e.g., properly functioning). In an embodiment, the engine control unit 122 may generate a control signal to alert an operator that one or more of the fuel supply devices 106 are defective, as well as identifying the specific defective fuel supply devices 106. The control signal may alert the operator via an audible sound or noise, a text-based message, a visual graphic or light, a vibration, and/or the like.

In an embodiment, the engine control unit 122 may monitor the injection durations of the fuel supply devices 106, as described above, and then utilize a look-up table to convert the time-based durations into volume-based fuel quantities based on historical data. For example, the look-up table may be stored in the memory 140 or another memory storage device. The engine control unit 122 accesses the look-up table. The look-up table may list varying quantities of fuel that are associated or correlated with different corresponding injection durations of the fuel supply devices. The correlations between the fuel quantities and the injection durations of the fuel supply devices may be determined experimentally, such as in a lab. For example, operators may empirically test the fuel supply devices to generate correlations between the injection duration in which a fuel supply device is in the open state and the amount of fuel injected during that injection duration. The operators may extrapolate the experimental data to fill in gaps in the experimental data, generating the look-up table. By utilizing the look-up table, the engine control unit 122 may determine the amount or quantity of fuel injected into the non-tested cylinders based on the measured injection durations, without monitoring the fuel supply flow rates or volumes directly.

Figure 6:
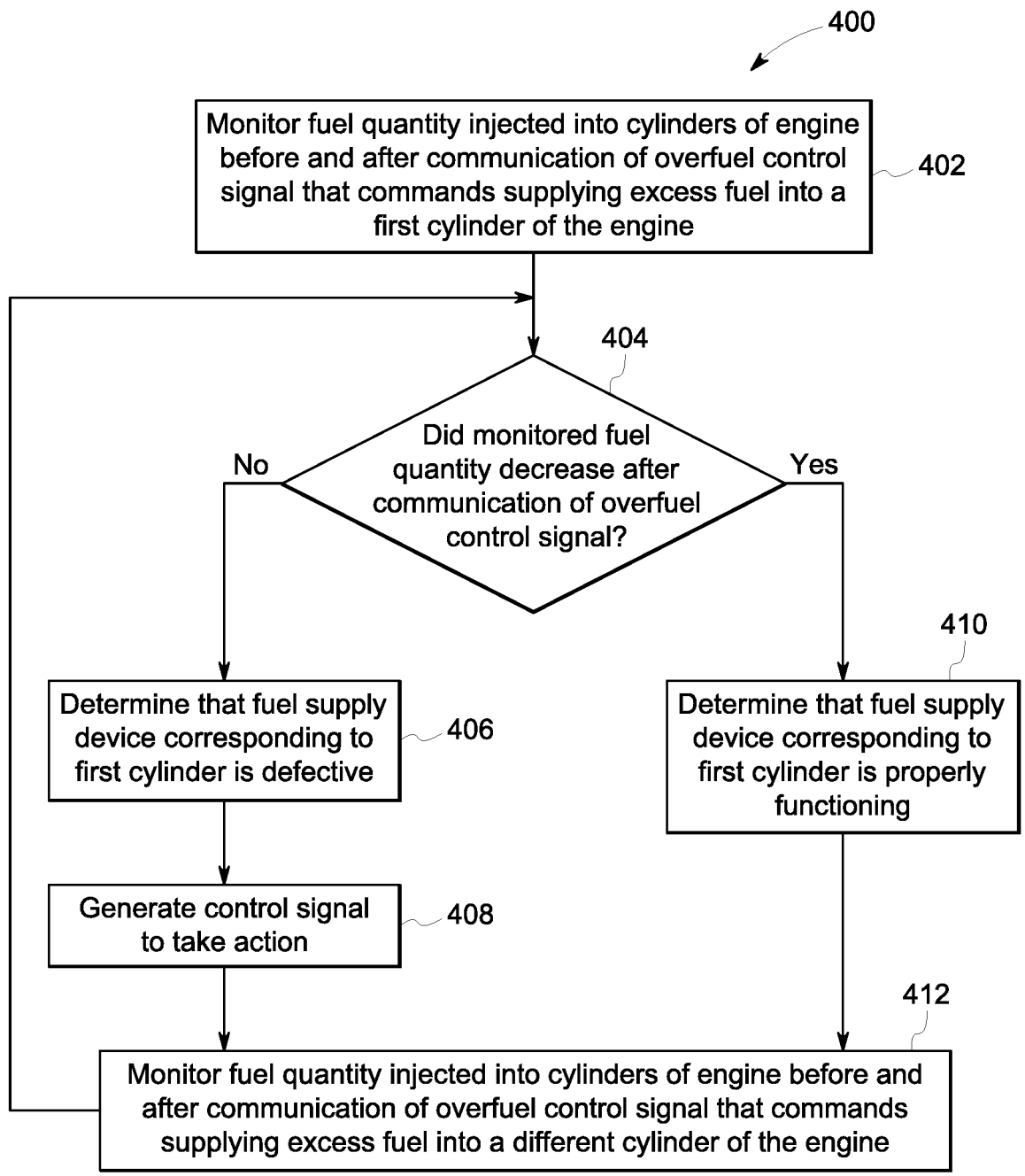
FIG. 6 is a flow chart of a method for detecting defective fuel supply devices in an engine according to an embodiment.

FIG. 6 is a flow chart of a method 400 for detecting defective fuel supply devices 106 in an engine 102 according to an embodiment. The method 400 can represent operations performed by one or more processors, such as processor(s) within the engine control unit 122 and/or another control unit or device. At 402, a quantity of fuel (e.g., fuel quantity) injected into multiple cylinders 110 of an engine 102 is monitored both before and after communication (e.g., transmission or broadcast) of an overfuel control signal. The overfuel control signal commands a fuel supply device 106 to supply an excess amount of fuel into a first cylinder 110 of the engine 102 to overfuel the first cylinder 110. The monitoring may be performed by the engine control unit 122 (e.g., the one or more processors 124 thereof). The multiple cylinders 110 that are monitored may represent all or at least some of the cylinders 110 of the engine 102 other than the first cylinder 110 that is overfueled.

In at least one embodiment, the quantity of fuel is indirectly monitored based on measured injection durations that represent time that fuel supply devices 106 are in an open state to inject fuel into the corresponding cylinders 110. For example, the method 400 may include measuring the injection durations both before and after the communication of the overfuel control signal, and utilizing a look-up table to convert the injection durations to fuel quantities based on correlations generated via experimental testing on the fuel supply devices 106.

At 404, it is determined whether or not the monitored quantity of fuel decreased after communication of the overfuel control signal. This determination asks whether the command to overfuel the first cylinder 110 has caused the amount of fuel supplied to other cylinders 110 of the engine 102 to decrease beyond a designated noise threshold. If the fuel supply device 106 connected to the first cylinder 110 is properly functioning, then the fuel supply device 106 increases the injection duration responsive to the overfuel control signal. The increased injection duration causes additional fuel to be supplied into the first cylinder 110 beyond a baseline or reference level. The excess fuel supplied to the first cylinder 110 produces a compensatory response in the other cylinders 110 such that the fuel supply devices 106 supply reduced amounts of fuel into the other cylinders 110 (e.g., below the baseline level) to balance or counteract the increase fuel supply to the first cylinder 110. As a result, the monitored quantity of fuel injected into the non-tested cylinders 110 decreases (e.g., to an extent that exceeds a designated non-zero noise range). For example, any monitored change in fuel quantity that does not decrease in excess of a designated noise range is not considered as a decrease at 404. Therefore, a decrease in the monitored fuel quantity that does not exceed the noise threshold range is considered as "no decrease" at 404. Conversely, a monitored decrease in fuel quantity in excess of the designated noise range is considered as a "decrease" at 404.

In a situation in which the monitored quantity of fuel injected into the other, non-tested cylinders 110 does decrease, then flow of the method 400 proceeds to 410. At 410, it is determined that the fuel supply device 106 corresponding to the first cylinder 110 is properly functioning.

If, on the other hand, the communication of the overfuel control signal does not result in a decrease in the quantity of fuel supplied to the other, non-tested cylinders 110, then the method 400 proceeds to 406. At 406, it is determined that the fuel supply device 106 corresponding to the first cylinder 110 is defective. For example, the fuel injector of the fuel supply device 106 may be stuck in a closed state, a fuel pump of the fuel supply device 106 may be inoperable, a fuel line of the fuel supply device 106 may be clogged, or the like. At 408, after determining that the fuel supply device 106 corresponding to the first cylinder 110 is defective, a control signal is generated to take one or more actions. For example, the control signal may schedule maintenance to repair or replace the fuel supply device 106 corresponding to the first cylinder 110. In another example, the control signal may alert an operator that the fuel supply device 106 corresponding to the first cylinder 110 is defective.

Regardless of whether or not the fuel supply device 106 connected to the first cylinder 110 is determined to be defective, the method 400 proceeds to 412 and the method 400 repeats by over-fueling different cylinders 110 of the engine 102 to determine whether any other fuel supply devices 106 are defective. At 412, a quantity of fuel injected into multiple cylinders 110 of an engine 102 is monitored both before and after communication of another overfuel control signal that commands a fuel supply device 106 to supply an excess amount of fuel into a different, second cylinder 110 of the engine 102 to overfuel the second cylinder 110. The method 400 then returns to the determination at 404. After over-fueling each of the cylinders 110 of the engine 102 by repeating the method 400 multiple times, the results will indicate which specific fuel supply devices 106 are defective. With this knowledge, an operator can accurately and confidently repair and/or replace only the defective fuel supply devices 106 without interfering with properly functional fuel supply devices 106.

Other embodiments generally relate to vehicle systems and components. Certain embodiments relate to systems and methods for predicting impending failures in vehicle systems and components. In one embodiment, a system for detecting incipient faults in an alternator includes an alternator having a field coil and a plurality of output windings, a field current controller configured to receive an AC input and convert the AC input into a regulated DC output that is supplied to a field coil of the alternator, and a controller configured to monitor at least one operating parameter of the field current controller and to compare a monitored value of the at least one operating parameter to a threshold range. Comparison of the monitored value to the threshold range may reveal whether or not incipient faults are present in the alternator, which may be evidence of impending alternator failure. In a particular embodiment, the alternator and field current controller may integrated into the same device.

Figure 7:
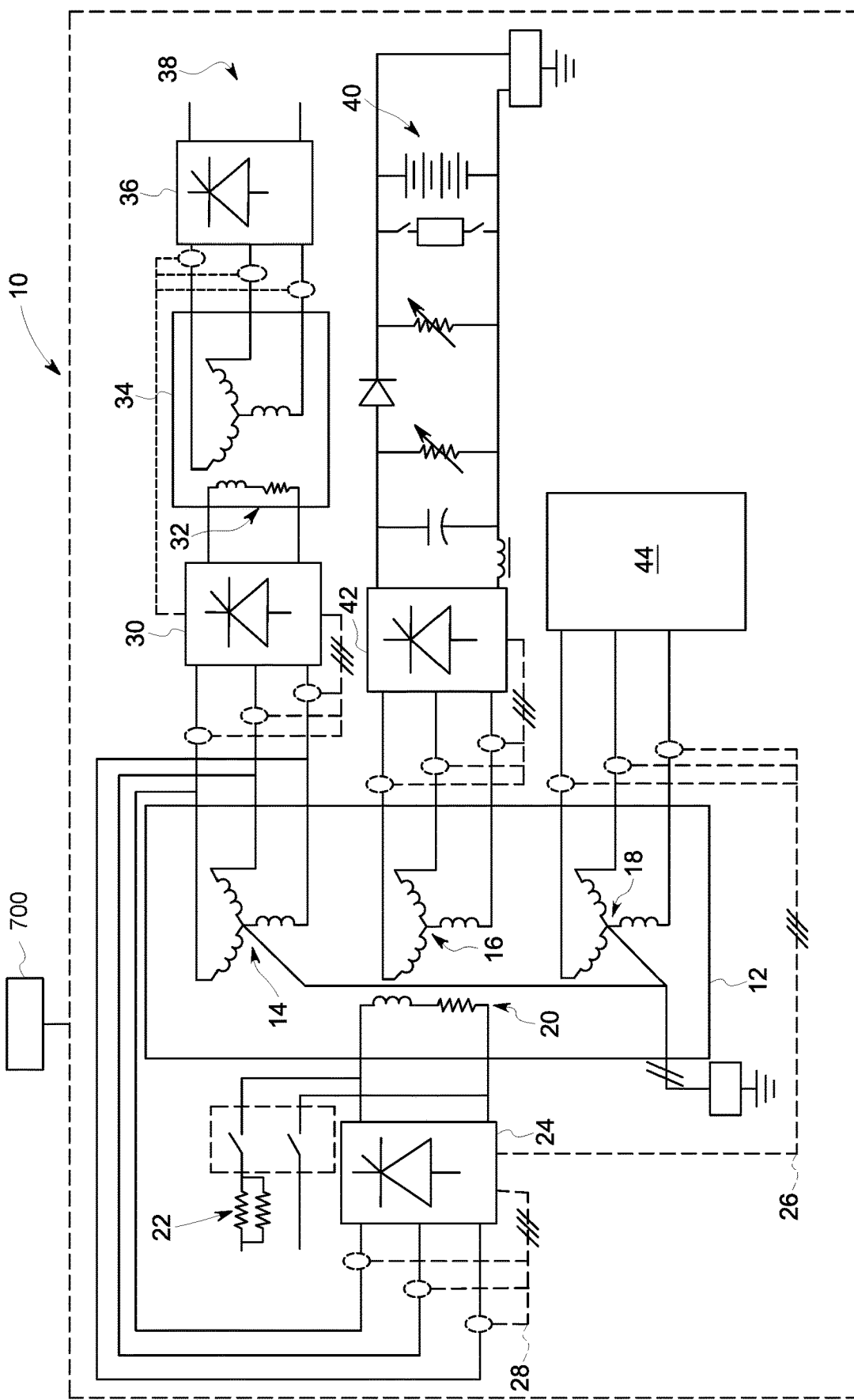
FIG. 7 is a functional block diagram of an auxiliary system of a vehicle, according to an embodiment.

FIG. 7 schematically illustrates an exemplary auxiliary system 10 for an electric drive machine such as a locomotive, other OHV, or other vehicle. The auxiliary system 10 includes an alternator 12 mechanically coupled to, and driven by, an engine (e.g., a diesel engine, a gasoline engine, a multi-fuel engine, etc.) (not shown). In an embodiment, the alternator 12 is a three-phase alternator having a plurality of output windings, for example, an excitation winding 14, a battery winding 16 and a motor winding 18. The alternator 12 is configured to convert the mechanical, rotational output of the engine into electrical energy in the form of alternating current for recharging batteries, powering traction motors, and powering other auxiliary electric motors of the electric drive machine, as discussed in detail hereinafter.

Figure 8:
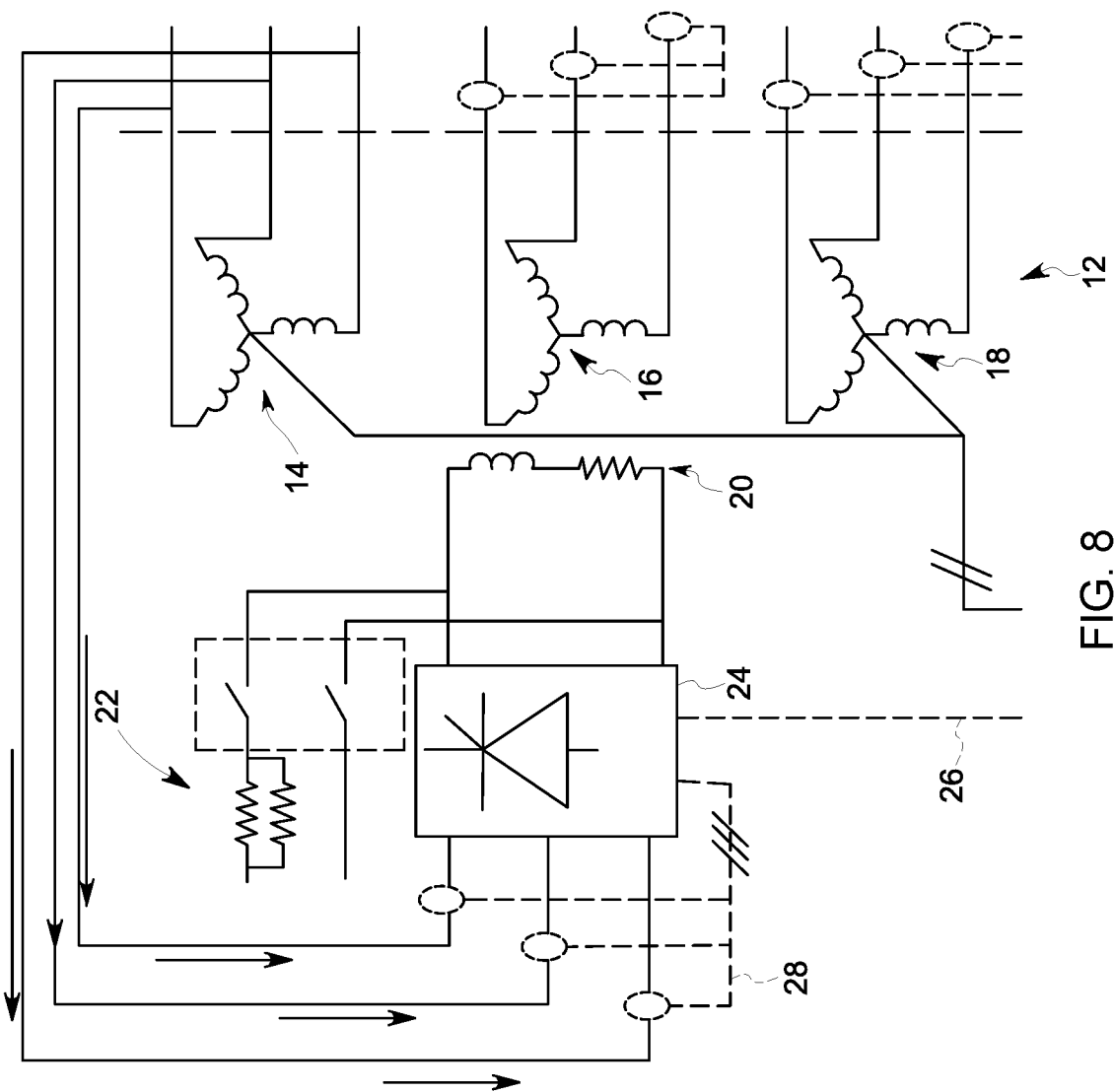
FIG. 8 is a detail view of a portion of the auxiliary system of FIG. 7.

As further illustrated in FIG. 7, the auxiliary system 10 includes a field coil 20 that supplies field current to the alternator 12. During startup, a battery 22 may supply the initial current to the field coil 20 for initial alternator operation. During operation, however, the alternator is self-sustaining. In particular, as illustrated in FIG. 8, the excitation output winding 14 of the alternator 12 produces a three-phase alternating current output, which is supplied as a three-phase AC input to an alternator control device 24. The alternator control device 24 is configured to convert the three-phase AC input into a regulated DC output. This DC output is supplied to the field coil 20 to excite the stator of the alternator 12 and provide the three separate, three phase outputs 14, 16, 18 for various vehicle or machine functions. The DC output is regulated by the alternator control device 24 by utilizing various voltage and current feedbacks from the three alternator output windings 14, 16, 18. As illustrated in FIGS. 7 and 8 1 and 2, the feedbacks may include, for example, motor winding and voltage feedbacks 26 and alternator control device input voltage and current feedbacks 28.

In an embodiment, as best illustrated in FIG. 8, the alternator control device 24 includes a plurality of silicon controlled rectifiers (SCRs) or thyristors that convert the AC input into the regulated DC output. The DC output of the alternator field coil 20 is controlled by the percentage the SCRs or thyristors of the alternator control device 24 are turned on in relationship to the phase angle of the AC input voltage. This parameter is defined herein as the "percent ON" of the alternator control device 24. As discussed in detail hereinafter, by monitoring the stability of the percent ON of the alternator control device 24, the health or integrity of the alternator 12 can be determined.

As further shown in FIG. 7, in an embodiment, the three-phase AC output of the excitation winding 14 may be utilized to power traction motors of the vehicle on which the system 10 is deployed. For example, the AC output of the excitation winding 14 may be provided to a traction control device 30 having, like alternator control device 24, a plurality of SCRs or thyristors. The traction control device 30 is configured to convert the three-phase AC input (from the excitation winding 14) into a regulated DC output that is provided to a field coil/field winding 32 of a traction alternator 34. In particular, this DC output is supplied to the field coil 32 to excite the stator of the traction alternator 34, which provides three separate three phase outputs to a traction rectifier 36.

The traction alternator 34 is configured to provide AC electric power to one or more rectifiers (e.g., rectifier 36), which are electrically connected to one or more power converters (not shown). The power converters may be connected to, for example, first and second traction motors (not shown) associated with first and second wheels of the vehicle on which the system 10 is deployed, respectively. As is known in the art, the rectifier 36 is configured to convert the AC power received from the traction alternator 34 into a DC output which is then fed to the power converters through a traction bus 38. The power converters are configured to supply three-phase, variable frequency AC power to the traction motors associated with the first and second wheels of the vehicle (typically the rear wheels of the vehicle). While the rectifier 36 is illustrated as being separate from the traction alternator 34, in certain embodiments, the rectifier may form a part of the alternator 34, as is known in the art. In an embodiment, the traction bus 38 is 1000-1500 VDC bus.

As further illustrated in FIG. 7, in an embodiment, the three-phase AC output of the battery winding 16 may be utilized to recharge one or more batteries 40 of the machine or vehicle on which the system 10 is deployed, under control of a battery control device 42. In particular, the battery control device 42 is configured to regulate the output voltage and current to charge batteries 40. In an embodiment, the battery control device 42 may be configured similarly to the control devices 24, 30 and operate in a similar manner.

In addition, the three-phase AC output of the motor winding 18 may be utilized to power one or more auxiliary motor loads 44. In particular, as shown in FIG. 7, the three-phase AC output of the motor winding 18 may be provided directly to one or more AC motors such as, for example, motors associate with auxiliary systems or components. In an embodiment, the motor loads 44 may include one or more of a compressor, an alternator, a blower, and air-to-air fan, a radiator fan, other cooling fans, a traction motor blower, etc.

As shown in FIG. 7, in an embodiment, the auxiliary system 10 may be electrically coupled to (so as to be in communication with) and controlled by, an on-board controller 700. In an embodiment, the controller 700 may be a master control unit for the vehicle that is configured to control overall operation of the vehicle and the various systems and components on-board the vehicle.

In connection with the above, the auxiliary alternator 12, as well as the main traction alternator 34, are critical components of the auxiliary system 10 deployed on a machine, locomotive, OHV or other vehicle. In particular, as described above, the alternator 12 may provide all the electrical power necessary to propel the vehicle, charge vehicle batteries, and power auxiliary devices such as cooling fans and the like. Accordingly, due to the fact that so many components and systems draw upon the alternator 12 for their own operation, failure of the alternator 12 may often result of stoppage of the entire vehicle or machine on which the alternator 12 is deployed. These unplanned stoppages can be very expensive in terms of lost revenue due to, for example, delayed cargo delivery, lost productivity of passengers, and expensive on-site repair or replacement of the failed alternator.

In order to substantially obviate such unplanned stoppages due to alternator failure, the system 10 of the present invention is configured to detect incipient faults in the alternator 12. By detecting such faults at an early stage, i.e., before failure of the alternator 12, the machine or vehicle can be scheduled for a planned service, at which time the alternator 12 may be repaired or replaced (rather than having to replace the alternator 12 in the field, after failure). In an embodiment, the controller 700 of the system 10 is configured to detect incipient faults in the alternator 12 by monitoring the percent ON of the alternator control device 24, as discussed hereinafter.

As indicated, the alternator control device/field current controller 24 continuously adjusts the firing of the controlled rectifier devices (e.g., the SCRs or thyristors) to regulate the generated voltage. An inter-turn fault in the alternator 12, however, reduces the instantaneous voltage generated at the output terminals of the alternator 12 for a given field current and speed. In response, the alternator control device 24 moves a reference command in order to compensate for the instantaneous voltage loss, and such reference command settles at a different value due to the permanent nature of the voltage loss. The duty-cycle of the controlled rectifier devices of the alternator control device 24 also changes and settles down at a higher value than during normal operation. By monitoring this duty-cycle signal (i.e., the switching patterns of the SCR or thyristors of the alternator control device 24) and comparing it against a corresponding duty-cycle signal during healthy alternator operation, inter-turn faults in the alternator may be detected before the alternator fails.

In particular, when there is some insipient fault in the windings of the alternator 12, it causes a short circuit, which in turn reduces the number of turns in such windings. Because the vehicle in which the system 10 is embodied runs on a constant voltage/frequency ratio, to maintain constant voltage at a constant engine speed, the alternator 12 requires more field current from the field coil 20. The field current controller 24 continuously adjusts the firing of the controlled rectifier devices (e.g., the SCRs or thyristors) to regulate the generated voltage.

As indicated above, the field current is directly controlled by the percent ON (also referred to as ON time) of the thyristors or SCRs of the alternator/field current control device 24. By measuring or monitoring the percent ON (or duty-cycle) of the field current control device 24, and then comparing this to the percent ON of the field current control device 24 under normal conditions (i.e., where it is known that there are no incipient faults in the alternator 12), alternator failure due to inter-turn winding faults can be predicted in advance. In particular, if the comparison reveals a difference in the percent ON of the alternator control device 24 outside of a predetermined range, or in excess of a predetermined 'normal' value, then this may be evidence that an incipient inter-turn fault may be present in the alternator 12. As discussed above, percent ON is the amount that the SCRs or thyristors of the alternator control device 24 are turned on in relation to the phase angle of the AC input voltage to the alternator control device 24.

In the event that an incipient fault is detected, this fact may be communicated to an operator of the vehicle such as, for example, through a visual or audio alert or notification. Alternatively, or in addition to notifying an operator, the detection of the incipient fault may be communicated to remote monitoring equipment so that maintenance may be scheduled to repair or replace the alternator 12. In addition, the controller is configured to control at least one of the alternator, the field current controller, or a vehicle in which the alternator is disposed responsive to one of: the at least one operating parameter falling outside of the threshold range; or receipt of a signal from a remote monitoring system that is sent to the controller responsive to the controller sending a notification to the remote monitoring system of the at least one operating parameter falling outside of the threshold range.

In an embodiment, the SCRs or thyristors of the alternator control device 24 operate between 0 percent and 100 percent. During normal operation (i.e., when there are no faults in the alternator 12), the percent ON of the alternator control device 24 is between approximately 15 percent and 40 percent (defining a normal operating range). Accordingly, in an embodiment, the controller 700 may be configured to generate an alert or notification to indicate an incipient fault in the alternator 12 when the percent ON of the alternator control device 24 is outside of this normal operating range (i.e., greater than 40 percent or less than 15 percent). In an embodiment, the controller 700 may be configured to generate an alert or notification when the percent ON of the alternator control device 24 is greater than approximately 40 percent.

Figure 9:
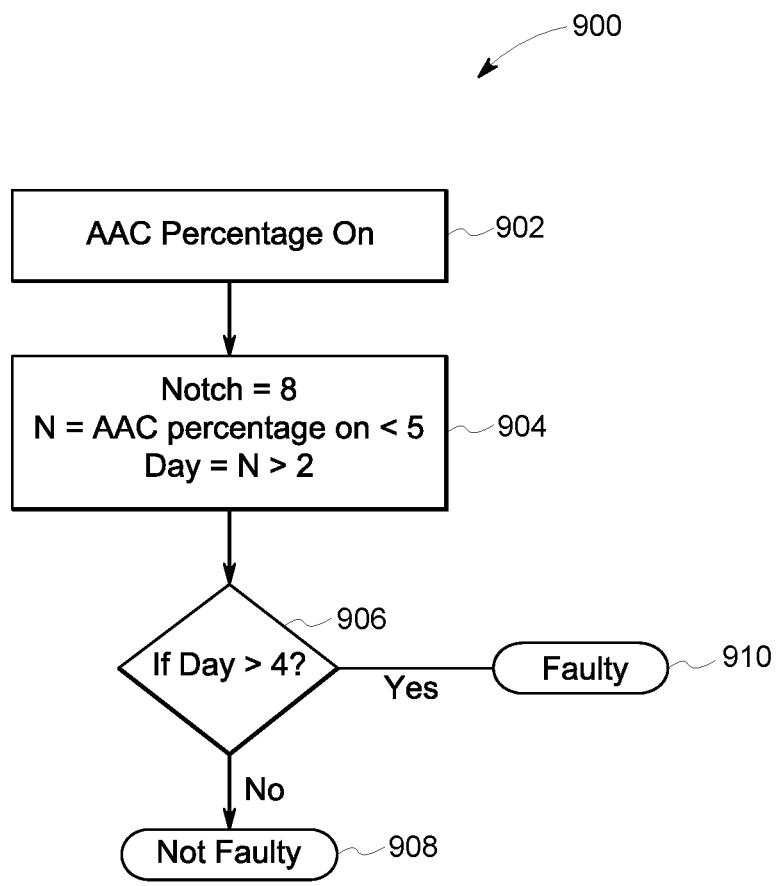
FIG. 9 is a flowchart illustrating a control method for an alternator, according to an embodiment.

Turning now to FIG. 9, an exemplary control routine 900 utilized by the controller 700 for determining an incipient fault in an alternator of a vehicle is illustrated. As discussed above, at step 902 the controller 700 monitors the percent ON of the field current controller 24 of the alternator 12. In an embodiment, the field current controller is monitored when the vehicle is in a designated operational state, that is, an operational state that is designated for testing or diagnosing the alternator and/or field current controller. Thus, the controller may be configured to control the vehicle to the designated operational state prior to monitoring the field current controller, and/or the controller may be configured to monitor the field current controller responsive to the vehicle operating in the designated operational state. In one aspect, the designated operational state is a designated throttle level of the vehicle. If the vehicle is a locomotive or other rail vehicle, the designated throttle level may be a designated notch level of the rail vehicle (notch referring to discrete throttle levels from zero/idle to eight/max, or the like, where the rail vehicle only operates in the discrete throttle levels). For example, where the vehicle is a locomotive or other rail vehicle, the percent ON may be monitored when the rail vehicle is operating at notch 8, or the rail vehicle may be specifically controlled to notch 8 (or another designated notch level) for monitoring purposes. At step 904, the determined percent ON is compared to a predetermined percent ON range for normal alternator operation. For example, as shown therein, if the determined percent ON is less than 5 percent ON, and this has been present for more than a preset duration (e.g., 2 days), then the controller moves on to step 906. At step 906, if the percent ON of the field current controller 24 has been below 5 percent for less than 4 days, then a "NOT FAULTY" determination is made at 908. Alternatively, if the percent ON of the field current controller has been below 5 percent for more than 4 days, then a "FAULT" determination is made at 910, at which time an alert or notification may be generated so that corrective action may be taken in advance of the alternator 12 actually failing.

In an embodiment, the controller is configured to automatically control the vehicle to the designated operational state independent of operations of the vehicle for traveling along a route (e.g., either when the vehicle is not traveling, or in a way that does not interfere with travel beyond acceptable tolerances). For example, in one aspect the controller is configured to monitor the field current controller when the vehicle happens to be operating in the designated operation mode, e.g., while traveling along a route. In another aspect, the controller is additionally or alternatively configured to control the vehicle to the designated operational mode specifically for testing/diagnosing the field current controller, separate from the vehicle being controlled for travel. For example, the vehicle may be controlled to the designated operational mode when parked, or when traveling but in a way that does not interfere with the travel (e.g., instead of operating at notch 7, operating at notch 6 for a time and then operating at notch 8, to arrive at the same overall throttle on average while still achieving the designated operational state of notch 8).

In an embodiment, the normal percent ON range of the field current controller 24 may be determined by the controller 700 or input by an operator. In addition, in an embodiment, the time period threshold utilized in step 906 may be determined by the controller 700 based upon average time to failure after incipient fault detection values, or may be manually input by an operator.

While the system and method of the present invention have been discussed above in connection with detecting incipient faults in the auxiliary alternator 12, the method may be utilized to detect incipient faults in the main traction alternator 34 that supplies power to the AC traction motors of the vehicle. In particular, the percent ON of the field current control device 30 may be monitored and compared against a normal duty cycle to determine deviations or departures therefrom, which may indicate an impending alternator failure. While the field current control devices 24, 30 have been shown and described herein as being separate components from the alternators 24, 34, respectively, in an embodiment, the field current control devices may be integrated into the respective alternators.

One or more embodiments of the inventive subject matter described herein relate to systems and methods that inspect a vehicle in order to diagnose a condition and the health of the vehicle. The systems and methods include a controller that is transferably coupled with a control system onboard the vehicle that controls operation of the vehicle. For example, the controller may be transferred between off-board and onboard the vehicle, wherein the controller is coupled with the control system when the controller is transferred onboard the vehicle. One or more processors of the controller may determine whether the control system has sensor information indicative of a state of the vehicle. Optionally, one or more sensor systems coupled with the controller, coupled with the control system, coupled with the vehicle, or the like, may have sensor information of the control system.

Responsive to determining that the control system lacks the sensor information, the one or more processors send a command signal to the control system instructing the control system of the vehicle to perform one or more operations. For example, the command signal instructs the control system to perform one or more operations in order for the controller to obtain sensor information based on the performance of operations by the vehicle. Using the sensor information and/or the status data obtained by the performance of operations by the vehicle, the one or more processors of the controller determines a condition of the vehicle. For example, the controller may autonomously and/or semi-autonomously determine an operational state, a fault state, a damaged state, or the like, of one or more components of the vehicle.

In one or more embodiments, the systems and methods include a first sensor system and a second sensor system. The first and second sensor systems may be operably coupled with one or more of the control system of the vehicle or with the controller. The first sensor system is configured to determine an operating characteristic of the vehicle, and second sensor system is configured to determine an externality characteristic of the first sensor system or an externality characteristic of the vehicle. For example, the externality characteristic of the first sensor system may represent an external condition to which the first sensor system is exposed to. The externality characteristic of the vehicle may represent an external condition to which the vehicle is exposed to. Using the operating characteristic of the vehicle determined by the first sensor system, the externality characteristic of the first sensor system determined by the second sensor system, the externality characteristic of the vehicle determined by the second sensor system, or any combination therein, the controller diagnoses an operational state of the vehicle. For example, the controller may autonomously and/or semi-autonomously diagnose an operational state, a fault state, a damaged state, a health score, or the like, of one or more components and or one or more systems of the vehicle.

This subject matter may be used in connection with rail vehicles and rail vehicle systems, or alternatively may be used with other types of vehicles. For example, the subject matter described herein may be used in connection with automobiles, trucks, mining vehicles, other off-highway vehicles (e.g., vehicles that are not designed or are not legally permitted for travel on public roadways), aerial vehicles (e.g., fixed wing aircraft, drones or other unmanned aircraft, or the like), or marine vessels.

The vehicle system can include two or more vehicles mechanically coupled with each other to travel along a route together. Optionally, the vehicle system can include two or more vehicles that are not mechanically coupled with each other, but that travel along a route together. For example, two or more automobiles may wirelessly communicate with each other as the vehicles travel along the route together as a vehicle system to coordinate movements with each other. Optionally, a vehicle system or consist may be formed from a single vehicle.

Figure 10:
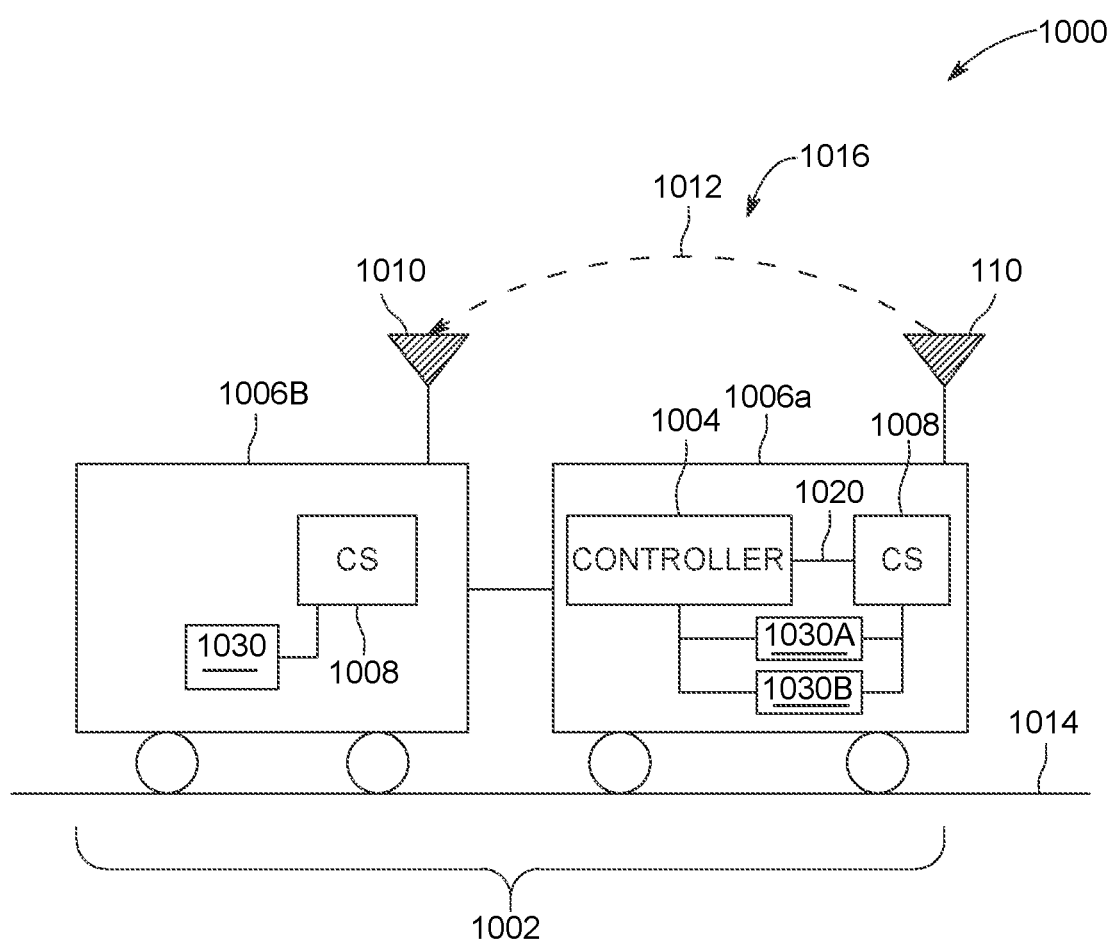
FIG. 10 illustrates a schematic illustration of an inspection system of a vehicle system in accordance with one embodiment.

FIG. 10 illustrates one embodiment of an inspection system 100 used to determine a condition of one or more vehicles 1006 of a vehicle system 1002. The illustrated vehicle system 1002 includes propulsion-generating vehicles 1006A, 1006B that travel together along a route 1014. Although the vehicles 1006 are shown as being mechanically coupled with each other, optionally the vehicles may not be mechanically coupled with each other. Instead, the vehicles can communicate with each other (while remaining mechanically separate) in order to coordinate the movements of the vehicles with each other so the vehicles travel together along the routes.

The propulsion-generating vehicles 1006A, 1006B are shown as locomotives and the vehicle system 1002 is shown as a train in the illustrated embodiment. Alternatively, the vehicles 1006 may represent other vehicles such as automobiles, rail vehicles, marine vessels, mining vehicles, aerial droves, other aerial vehicles, or the like and the vehicle system 1002 can represent a grouping or coupling of these vehicles. The number and arrangement of the vehicles 1006 in the vehicle system 1002 is provided as one example and is not intended as a limitation on all embodiments of the subject matter described herein.

The propulsion-generating vehicles 1006 can be arranged in a distributed power (DP) arrangement. For example, the vehicle system 1002 can include a first vehicle 1006A that issues control signals to a second vehicle 1006B. The designations "first" and "second" are not intended to denote spatial locations of the propulsion-generating vehicles 1006 in the vehicle system 1002, but instead are used to indicate which propulsion-generating vehicle 1006 is communicating (e.g., transmitting, broadcasting, or a combination of transmitting and broadcasting) control signals and which propulsion-generating vehicle 1006 is being remotely controlled using the control signals. For example, the first vehicle 1006A may or may not be disposed at a front end of the vehicle system 1002 (e.g., along a direction of travel of the vehicle system 1002). Additionally, the remote second vehicle 1006B need not be separated from the first vehicle 1006A or may be separated from the first vehicle 1006A by one or more other propulsion-generating vehicles 1006 and/or non-propulsion-generating vehicles.

The control signals issues by the first vehicle 1006A to the second vehicle 1006B may include directives that direct operations of the remote second vehicle 1006B. These directives can include propulsion commands that direct propulsion subsystems of the second vehicle 1006B to move at a designated speed and/or power level, brake commands that direct the second vehicle to apply brakes at a designated level, and/or other commands, or the like. The first vehicle 1006A issues the control signals to coordinate the tractive efforts and/or braking efforts provided by the propulsion-generating vehicle 1006B in order to propel the vehicle system 1002 along the route 1014, such as a track, road, waterway, or the like.

The control signals can be communicated using a communication system 1016. In one or more embodiment, the control signals are wirelessly communicated using the communication system 1016. The communication system 1016 may include one or more components onboard the propulsion-generating vehicles 1006 that are used to establish a communication link 1012 between the vehicles 1006 in the vehicle system 1002.

The communication system 1016 may include wireless transceiving hardware and circuitry (e.g., antennas 1010) disposed onboard the propulsion-generating vehicles 1006. For example, the second vehicle 1006B may be remotely controlled by the first vehicle 1006A by the communication link 1012 established between the first and second vehicles 1006A, 1006B. Additionally or alternatively, the propulsion-generating vehicles 1006 may be communicatively linked through a wired connection between one or more of the propulsion-generating vehicles 1006 or non-propulsion-generating vehicles.

The propulsion-generating vehicles 1006A, 1006B each include a control system 1008 disposed onboard the vehicles 1006. The control system 1008 can include hardware circuits or circuitry that include and/or are connected with one or more processors that perform the operations described herein in connection with the control system 1008. The control system 1008 can control or limit movement of the vehicles 1006 and/or the vehicle system 1002 based on one or more limitations. For example, the control system 1008 can prevent the vehicles 1006 from entering a restricted area, can prevent the vehicles 1006 from exiting a designated area, can prevent the vehicles 1006 from traveling at a speed that exceeds an upper speed limit, can prevent the vehicles from traveling at a speed less than a lower speed limit, can instruct the vehicles 1006 to travel according to a designated trip plan generated by an energy management system, can control one or more of a throttle setting, brake setting, speed setting, radiator fan speed, pump speed, coolant flow rate, or the like of the vehicles. For example, the control system 1008 may monitor and/or control operations of a cooling system of the vehicles such as increase, decrease, stop, limit, or the like, the amount of coolant (e.g., air or liquid coolant) that flows through the cooling system of the vehicle 1006. The control system 1008 will be discussed in more detail below with FIG. 11.

The inspection system 100 includes a controller 1004 that is transferably coupled with the control system 1008 of one or more of the vehicles 1006. For example, the controller 1004 may be coupled with (e.g., connected to, plugged into) the control system 1008 of the first vehicle 1006A, subsequently uncoupled with (e.g., disconnected, unplugged) the control system 1008 of the first vehicle 1006A, and then subsequently coupled with (e.g., connected to, plugged into) one or more of the control system 1008 of the second vehicle 1006B, an alternative vehicle system, or the like. The controller 1004 is off-board the vehicle system 1002 during movement of the vehicle system 1002. For example, the controller 1004 is off-board the vehicle 1006 and/or the vehicle system 1002 when the vehicle system 1002 is traveling along the route 1014 from a first location to a different, second location (e.g., during typical transit of the vehicle system 1002). Alternatively, the controller 1004 is transferred to be onboard the vehicle 1006 and/or vehicle system 1002 during alternative movement of the vehicle system 1002. For example, the controller 1004 may be transferred from off-board the vehicle 1006 to onboard the vehicle 1006 when the vehicle 1006 or vehicle system 1002 has slowed, has come to a stop, has been forced to a stop due to a fault of the vehicle, or the like. For example, the controller 1004 may be transferred to be onboard the vehicle 1006 at a vehicle repair center, or the like.

The controller 1004 is operably coupled with the control system 1008 for an inspection event or a maintenance event for the one or more vehicles 1006 of the vehicle system 1002. The inspection event may include inspection of one or more components of the vehicle 1006 (e.g., radiator fans, pumps, heat exchangers, compressors, or the like), one or more systems of the vehicle 1006 (braking system, cooling system, propulsion subsystem, communication systems, or the like). For example, one or more components, one or more systems, or a combination of one or more components and/or systems therein, may need to be inspected by the controller 1004 of the inspection system 100 in order to determine an operational state, a fault state, a damaged state, a health score, a condition, or the like, of the components and/or systems of the vehicle system 1002. The maintenance event may include maintenance (e.g., repair, replacement, or the like) of a component of the vehicle 1006 and/or of a system of the vehicle 1006. For example, one or more components, one or more systems, or a combination of one or more components and/or systems therein, may need to be repaired based on a condition of the components and/or systems determined by the controller 1004.

The controller 1004 may communicate with the control system 1008 via a wireless communication link, a wired connection, or the like, during the inspection event and/or during the maintenance event. For example, in the illustrated embodiment of FIG. 10, the controller 1004 is disposed onboard the vehicle 1006 during the inspection event, and may communicate with the control system 1008 via a wired connection. Additionally or alternatively, the controller 1004 may be disposed off-board the vehicle 1006 during the inspection and/or maintenance event and may communicate with the control system 1008 via a wireless connection. Optionally, the controller 1004 may be disposed off-board the vehicle 1006 during a first inspection event, and may be subsequently disposed onboard the vehicle 1006 during the same, first inspection event. The controller 1004 may be transferable between onboard and off-board the vehicle 1006 during inspection, maintenance, or the like, of the vehicle system 1002. For example, the controller 1004 may be a laptop computer, a tablet computer, or an alternative cordless device, that may be operably coupled with the control system 1008 when the controller 1004 is onboard the vehicle, may be operably coupled with an external sensor that is transferable between off-board and onboard the vehicle 1006 (e.g., an inspection sensor system that is operably coupled to the vehicle during inspection and/or maintenance of the vehicle), or the like. Alternatively or additionally, the controller may be one or more of: handheld; portable; battery powered; powered via a removable power cord that is connectable to an external power source; both battery powered and powered via a power cord; and/or communicatively connectable to a vehicle (for transmitting and receiving signals from the vehicle) via wireless and/or wired connections, e.g., Ethernet.

The controller 1004 controls movement of the vehicle 1006 with the control system 1008 during the inspection event and/or maintenance event. For example, the controller 1004 may selectively over-ride, take control of, or the like, one or more settings of the control system 1008 that control operations and/or movement of the vehicle 1006 when the controller 1004 is coupled with the control system 1008. Additionally or alternatively, the controller 1004 may not control movement of the vehicle 1006 with the control system 1008 during the inspection event and/or maintenance event. For example, the controller 1004 may inspect and/or maintain the vehicle 1006 while the vehicle 1006 travels along the route 1014. The controller 1004 sends one or more command messages to the control system 1008 in order to obtain sensor information indicative of a state of the vehicle 1006 in order to determine a condition of the vehicle 1006. Additionally or alternatively, the controller 1004 may be operably coupled with the control system 1008 in order to control one or more operations of the vehicle 1006 in order to obtain sensor information indicative of a state of the vehicle 1006 in order to determine the condition of the vehicle. The controller 1004 will be discussed in more detail below with FIG. 12.

The inspection system 100 includes one or more control system sensors 1130 that are maintained at a position onboard the vehicle 1006. The control system sensors 1130 are operably coupled with the controller 1004 and/or with the control system 1008. For example, the vehicle 1006 may have control system sensors that are not transferable between onboard and off-board the vehicle 1006. For example, the one or more control system sensors may be fixed onboard the vehicle 1006 and sense information (e.g., monitor, gather, measure, collect, read, or the like) of systems of the vehicle (e.g., the propulsion subsystem, an energy-management system, or the like) and/or components of the vehicle during movement of the vehicle 1006 (e.g., during a trip). The control system sensors 1130 will be described in more detail below.

The inspection system 100 includes one or more external sensor systems 1030 that are selectively coupled to the vehicle 1006 during an inspection event and/or a maintenance event of the vehicle 1006 in accordance with one embodiment. The external sensor systems 1030 may sense temperature, pressure, vibrations, fluid flow rates, gas flow rates, visually inspect via a camera, audio inspect via a microphone, or the like. For example, the external sensor systems 1030 may be coolant temperature sensors, manifold absolute pressure sensors, air flow meters, or the like, configured to sense (e.g., monitor, gather, measure, read, collect, or the like) information that is indicative of the state of the vehicle 1006, the state of one or more components of the vehicle, and/or the state of one or more systems or the vehicle. One example of a configuration of the external sensor systems 1030 is described below with FIGS. 4 and 5.

The external sensor system 1030A may be a first external sensor system, and the external sensor system 1030B may be a second external sensor system. The designations "first" and "second" are not intended to be spatial locations of the external sensor systems 1030, but instead are used to indicate which external sensor system may have first sensor information and which external sensor system may have second sensor information. The first and/or second external sensor systems 1030A, 1030B are selectively coupled to the first and/or second vehicle 1006, to the vehicle system 1002, or any combination therein. For example, the first external sensor system 1030A may be a coolant temperature sensor, selectively coupled to the vehicle 1006 at a location near the engine water inlet conduit in order to sense the coolant temperature during inspection of the vehicle cooling system. Alternatively, the first external sensor system 1030A (e.g., the coolant temperature sensor) may be selectively disconnected from the vehicle 1006 if the inspection event does not include inspection of the vehicle cooling system. For example, the external sensor systems 1030 may be selectively disconnected from the vehicle 1006 subsequent to the inspection event and/or the maintenance event. One or more external sensor systems 1030 may be transferred off-board the vehicle 1006 subsequent to the inspection event, and one or more external sensor systems 1030 may remain disposed onboard the vehicle 1006 subsequent to the inspection event.

The external sensor systems 1030 are transferable between onboard and off-board the vehicle 1006 and are operably coupled with the controller 1004 in accordance with one embodiment. The first and second external sensor systems 1030A, 1030B may be transferred between off-board and onboard the vehicle 1006, transferred between a first location and a second location onboard the vehicle 1006, transferred between the first vehicle 1006A and the second vehicle 1006B, or the like.

The first external sensor system 1030A may sense (e.g., monitor, gather, measure, collect, read, or the like) first sensor information (e.g., the engine oil inlet temperature) during a first operation of the vehicle 1006, and the second external sensor system 1030B may sense (e.g., monitor, gather, measure, collect, read, or the like) second sensor information (e.g., the engine water inlet temperature) during a second operation of the vehicle 1006. For example, the first external sensor system 1030A may be selectively coupled to the vehicle 1006 at a first location (e.g., coupled to an engine oil inlet conduit in order to measure the temperature of the oil that is directed into the engine) during a first operation of the vehicle 1006 (e.g., at an increasing speed of the vehicle), and the second external sensor 1030B may be selectively coupled to the vehicle 1006 at a second location (e.g., coupled to an engine water inlet conduit in order to measure the temperature of the coolant that is directed into the engine) during a second operation of the vehicle 1006 (e.g., at a decreasing speed of the vehicle) during a vehicle inspection event.

Optionally, the first and second external sensor systems 1030 may be disposed at a same location onboard the vehicle 1006 in order to sense the first sensor information during the first operation of the vehicle with the first external sensor system 1030A, and to sense the second sensor information during the second operation of the vehicle with the second external sensor system 1030B. Optionally, the first external sensor system 1030A may be selectively coupled to the vehicle, and the second external sensor system 1030B may not be selectively coupled to vehicle.

In the illustrated embodiment, the first and second external sensor systems 1030 are disposed onboard the first vehicle 1006A. Optionally, the first external sensor system 1030A may be disposed onboard the first vehicle 1006A, and the second external sensor system 1030B may be disposed onboard the second vehicle 1006B. For example, in the distributed power arrangement, the first vehicle 1006A may instruct the second vehicle 1006B to change the brake setting. The second external sensor system 1030B may sense the second sensor information (e.g., measure the air brake pressure of the second vehicle 1006B propulsion subsystem) during operation of the vehicle system 1002.

In one embodiment, the first external sensor system 1030A determines an operating characteristic of the vehicle 1006. For example, the first external sensor 1030A may sense (e.g., measure, read, collect) sensor information that is indicative of how one or more components and/or one or more systems of the vehicle 1006 are operating. In one example, the first external sensor system 1030A may be a pressure sensor configured to measure the air pressure of the air brake system. The first external sensor system 1030A may determine that an air compressor of the brake system is not operating to increase the pressure in the brake system within a designated time limit. In another example, the first external sensor system 1030A, selectively coupled with the vehicle 1006, may determine that a heat exchanger of the cooling system is reducing the temperature of the coolant to a designated temperature range. Optionally, the operating characteristic may be any alternative characteristic of the vehicle 1006.

In one embodiment, the second external sensor system 1030B determines an externality characteristic of the first external sensor system 1030A that is representative of an external condition to which the first external sensor system 1030A is exposed. The external condition may be an ambient temperature, ambient pressure, ambient humidity, or the like, of the environment to which the first external sensor system 1030A is exposed. For example, the second external sensor system 1030B may determine that the first external sensor system 1030A is exposed to a temperature that is greater than a designated threshold temperature, such as when the first external sensor system 1030A is sensing operating characteristics of a vehicle when the vehicle is located in Phoenix, Ariz. compared to when the vehicle is located in Buffalo, N.Y. Additionally or alternatively, the external condition to which the first external sensor system 1030A is exposed may be a temperature, pressure, humidity, or the like, of the vehicle 1006. For example, the first external sensor system 1030A may be operably coupled to an exhaust conduit of the engine. The second external sensor system 1030A may determine that the first external sensor system 1030A is exposed to a temperature that is greater than a designated threshold temperature, such as when the first external sensor system 1030A is operably coupled to an engine exhaust conduit compared to when the first external sensor system 1030A is operably coupled to an engine coolant input conduit.

Additionally, the second external sensor system 1030B determines an externality characteristic of the vehicle 1006 that is representative of an external condition to which the vehicle 1006 is exposed. For example, the second external sensor system 1030B may determine that the vehicle is exposed to an air pressure that is lower than a designated threshold pressure, such as when the vehicle 1006 is located in Denver, Colo. compared to when the vehicle 1006 is located in New Orleans, La.

In one embodiment, the external sensor systems 1030 verify the functionality of the control system sensors 1130. For example, the external sensor systems 1030 may validate the sensed information that is obtained, monitored, collected, measured, read, or the like, by the control system sensors 1130. The external sensor systems 1030 may sense information that is the same, or similar to the sensed information sensed by the control system sensors 1130 in order to check that the control system sensors 1130 are functioning correctly, in order to check if one or more of the control system sensors 1130 are not functioning correctly, or the like.

Figure 11:
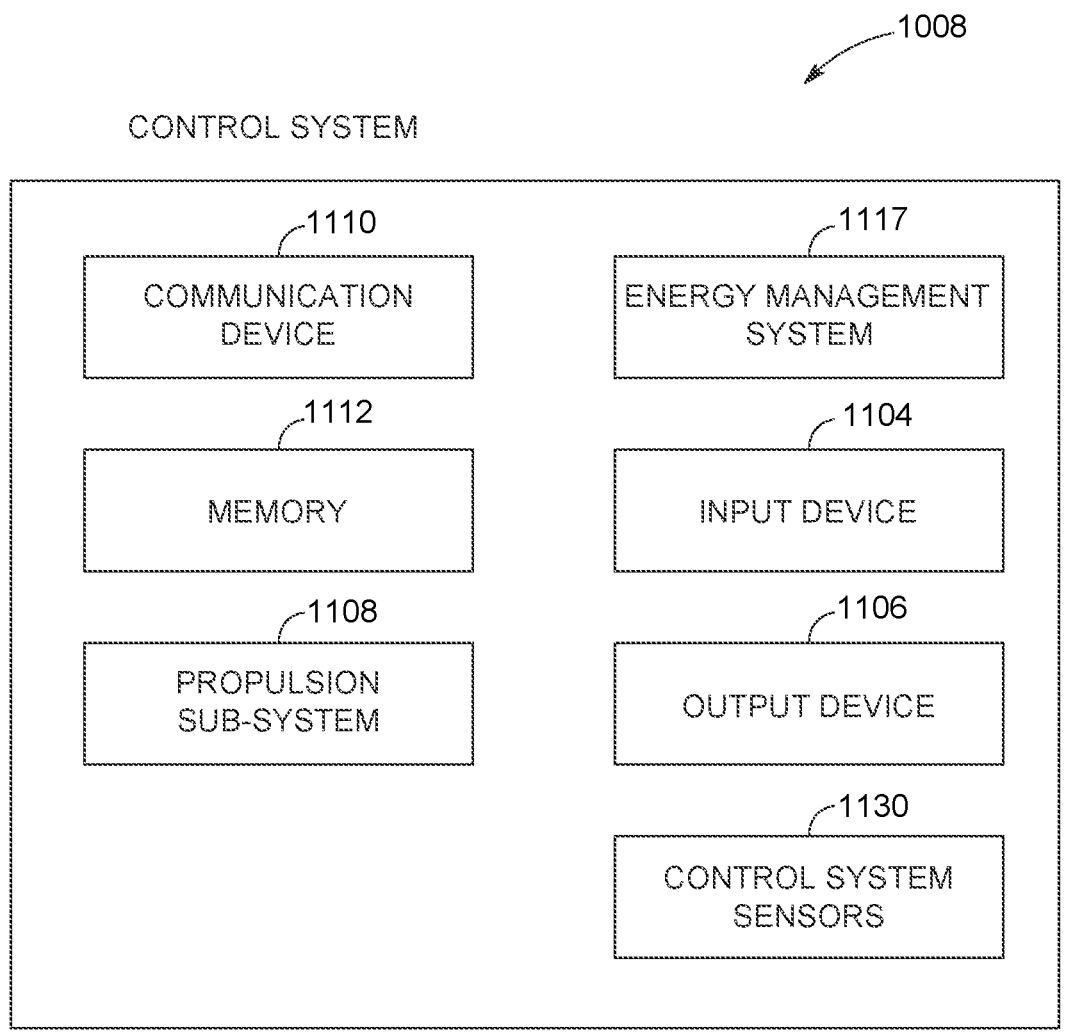
FIG. 11 illustrates a schematic illustration of an onboard control system for a propulsion-generating vehicle in accordance with one embodiment.

FIG. 11 is a schematic illustration of the control system 1008 disposed onboard the vehicles 1006 in accordance with one embodiment. The control system 1008 controls operation of the vehicles 1006. The control system 1008 can include or represent one or more hardware circuits or circuitry that include, are connected with, or that both include and are connected with one or more processors, controllers, or other hardware logic-based devices that perform the operations described herein in connection with the control system 1008. The control system 1008 is connected with an input 1104 and an output 1106. The control system 1008 can receive manual input from an operator of the vehicle 1006 through the input 1104, such as a touchscreen, keyboard, electronic mouse, microphone, throttle handle, switch, or the like. For example, the control system 1008 can receive manually input changes to the tractive effort, braking effort, speed, power output, and the like, from the input 10104. For example, the control system 1008 may receive a single instance of an actuation of the input 1104 to initiate the established communication link 1012 between the vehicles 1006A, 1006B.

The control system 1008 can present information to the operator of the vehicles 1006 using the output 1106, which can represent a display screen (e.g., touchscreen or other screen), speakers, printer, or the like. For example, the control system 1008 can present the identities and statuses of the vehicles 1006A, 1006B, identities of missing vehicles (e.g., those vehicles from which the vehicle 1006A has not yet received status information), contents of one or more command messages, or the like.

The control system 1008 is connected with a propulsion subsystem 1108 of the vehicle 1006. The propulsion subsystem 1108 provides tractive effort and/or braking effort of the propulsion-generating vehicles 1006. The propulsion subsystem 1108 may include or represent one or more engines, motors, alternators, generators, brakes, batteries, turbines and the like, that operate to propel the vehicles 1006 under the manual or autonomous control that is implemented by the control system 1008. For example, the control system 1008 can generate control signals autonomously or based on manual input that is used to direct operations of the propulsion system 10108.

The control system 1008 is connected with a communication device 1110 and a memory 1112 in the vehicle 1006. The memory 1112 can represent an onboard device that electrically and/or magnetically stores data. For example, the memory 1112 may represent a computer hard drive, random access memory, read-only memory, dynamic random access memory, an optical drive, or the like. The memory 1112 stores status data of the vehicle 1006 and/or the vehicle system 1002 that is indicative of the state of the vehicle 1006 and/or vehicle system 1002 during transit of the vehicle 1006 and/or vehicle system 1002. For example, the memory 1112 may store data obtained from previous operations of the propulsion sub system 10108 of the vehicle 1006 and/or of the propulsion subsystem 1108 of each vehicle of the vehicle system 1002 (e.g., data from the most recent trip, the ten most recent trips, all past trips, or the like). Additionally or alternatively, the memory may store data obtained from previous operations of individual components of the propulsion subsystem 1108, such as one or more of radiator shutter functionality, radiator cooling fan functionality, coolant flow rates, engine temperature measurements, engine water inlet temperatures, engine lube inlet temperatures, or the like.

The communication device 1110 includes or represents hardware and/or software that is used to communicate with other vehicles in the vehicle system 1002. For example, the communication device 1110 may include a transceiver and associated circuitry (e.g., antenna 1010 of FIG. 10) for wirelessly communicating (e.g., communicating and/or receiving) linking messages, command messages, reply messages, repeat messages, or the like. Optionally, the communication device 1110 includes circuitry for communicating messages over a wired connection, such as an electric multiple unit (eMU) line of the vehicle system 1002 (not shown), catenary or third rail of electrically powered vehicles, or another conductive pathway between or among the vehicles 1006 of the vehicle system 1002.

The control system 1008 is connected with an energy management system 1117. The energy management system 1117 can include hardware circuits or circuitry that include and/or are connected with one or more processors that perform the operations described herein in connection with the energy management system 1117. The energy management system 1117 can create a trip plan for trips of the vehicles 1006 and/or the vehicle system 1002 that includes the vehicles 1006. A trip plan may designate operational settings of the propulsion-generating vehicles 1006 and/or the vehicle system 1002 as a function of one or more of time, location, or distance along a route for a trip. Traveling according to the operational settings designated by the trip plan may reduce fuel consumed and/or emissions generated by the vehicles and/or the vehicle system 1002 relative to the vehicles and/or vehicle system traveling according to other operational settings that are not designated by the trip plan. The identities of the vehicles in the vehicle system 1002 may be known to the energy management system 1117 so that the energy management system 1117 can determine what operational settings to designate for a trip plan to achieve a goal of reducing fuel consumed and/or emissions generated by the vehicle system 1002 during the trip.

The control system 1008 includes the one or more control system sensors 1130. The control system sensors 1130 sense temperature, pressure, vibrations, fluid flow rates, gas flow rates, visually inspect via a camera, audio inspect via a microphone, or the like, of one or more components and/or systems of the vehicle 1006. For example, the control system sensors 1130 may be coolant temperature sensors, manifold absolute pressure sensors, air flow meters, or any alternative sensors. The control system sensors 1130 are operably coupled with one or more components and/or systems of the vehicle 1006 in order to sense information indicative of the components and/or systems during movement of the vehicle (e.g., during a trip). Additionally, the control system sensors 1130 are operably coupled with the controller 1004 during the inspection event and/or the maintenance event of the vehicle 1006. For example, the controller 1004 may obtain sensor information from the control system sensors 1130 during an inspection event of the vehicle.

Figure 12:
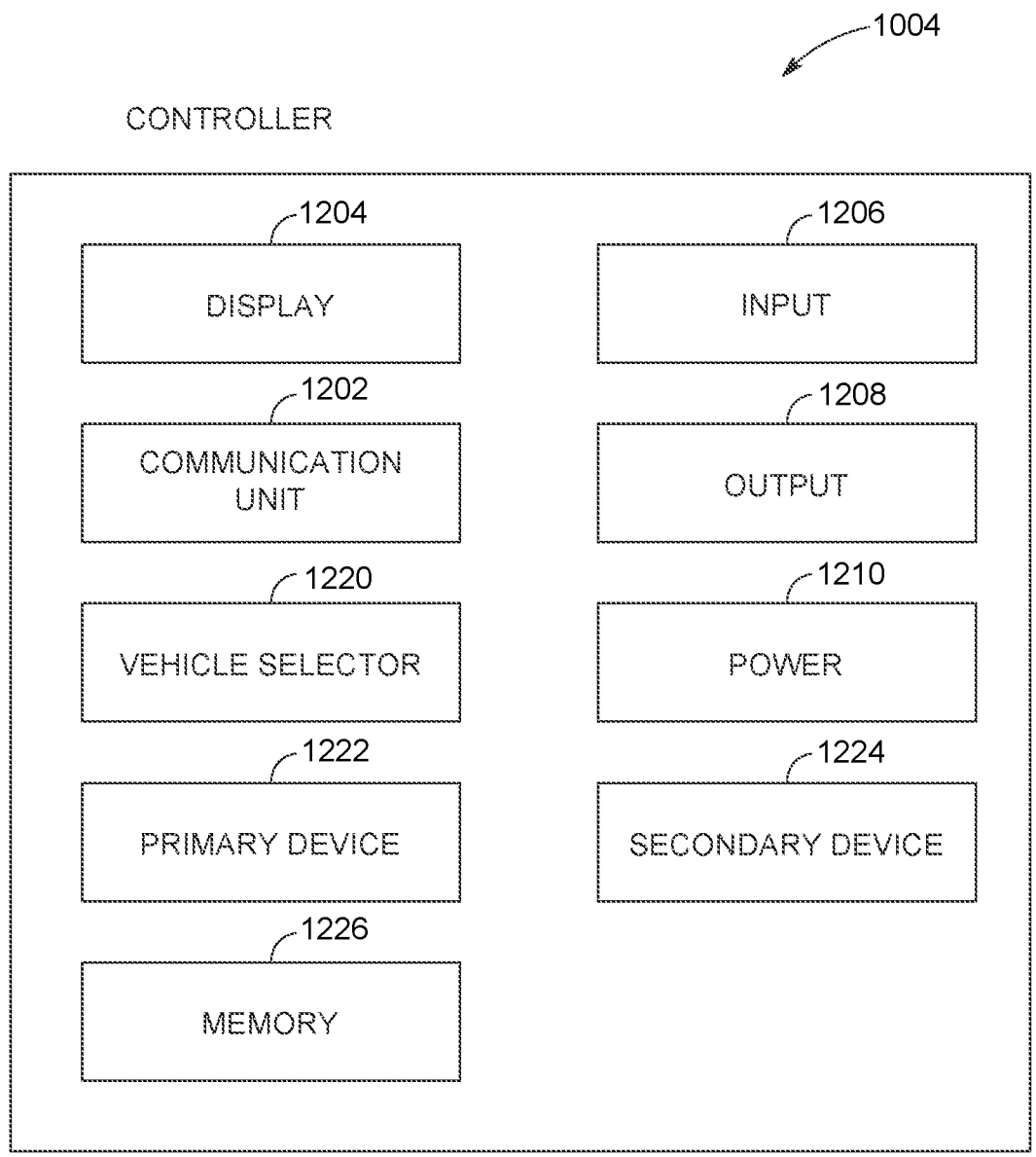
FIG. 12 illustrates a schematic illustration of a controller in accordance with one embodiment.

FIG. 12 illustrates a schematic illustration of the controller 1004 in accordance with one embodiment. The controller 1004 is transferable between off-board and onboard the vehicle 1006. The controller 1004 may be onboard and/or off-board the vehicle 1006 and/or the vehicle system 1002 and is operably coupled with the control system 1008 of the vehicle 1006. For example, the controller 1004 may be wirelessly connected to the control system 1008, mechanically coupled via an Ethernet cable, or the like. The controller 1004 represents hardware circuitry that includes and/or is connected with one or more processors (e.g., microprocessors, controllers, field programmable gate arrays, integrated circuits, or the like) that perform the operations described herein in connection with the controller 1004. The method of operation of the controller 1004 will be discussed in more detail below with FIG. 15.

The controller 1004 generates command signals that are communicated by a communication unit 1202. The command signals control operations of the vehicle 1006. For example, the command signals instruct the control system 1008 to initiate one or more operations of the vehicle during inspection and/or maintenance of the vehicle 1006. The communication unit 1202 can send and/or receive communication signals with the vehicle 1006 by a communication link 1020 between the control system 1008 and the controller 1004. The controller 1004 receives one or more of status data, sensor information, image data, or the like, that is stored by the memory 1112 of the control system 1008. For example, the controller 1004 may receive status and/or sensor information that is indicative of the current state of the vehicle 1006, that is indicative of the state of the vehicle 1006 during a previous operation (e.g., a past trip), that is indicative of the state of components and/or systems of the vehicle 1006 during an instructed operation of the vehicle 1006, or the like.

In one or more embodiments, the controller 1004 may control the communication device 1110 of the control system 1008 by activating the communication device 1110. The control system 1008 examines the messages that are received by the communication device 1110. For example, the control system 1008 of the vehicle 1006 can examine received command messages to determine if the directives have been sent by the controller 1004, sent from one or more additional vehicles of the vehicle system 1002, or from any other system. The control system 1008 implements the directive by creating control signals that are communicated to one or more systems of the vehicle 1006 and/or one or more systems of the vehicle system 1002 for autonomous control and/or implementation of the directive. For example, the braking system of the vehicle system 1002 may need to be inspected. The controller 1004 may communicate a directive that instructs the control system 1008 of the first vehicle 1006A to increase the throttle setting of the propulsion subsystem of the first vehicle 1006, and subsequently communicate a second directive to the control system 1008 instructing the system 1002 to increase a brake setting of the system 1002 in order for the braking system, and components associated with the braking system, to be inspected. Optionally, the controller 1004 may communicate directives to the control system 1008 to simulate operating conditions of the vehicle 1006 in order to inspect, maintain, or determine a condition of any alternative system, any subsystem of a vehicle system 1002, any components of the vehicle 1006, or the like. Optionally, the controller 1004 may communicate directives to the control system 1008 of the first vehicle 1006 to simulate operating conditions of the second vehicle 1006B in the distributed power arrangement.

The controller 1004 can include one or more input devices 1206 and/or output devices 308 such as a keyboard, an electronic mouse, stylus, microphone, touch pad, or the like. The input and/or output devices 1206, 308 are used to communicate command signals to the control system 1008. Additionally or alternatively, the input and/or output devices 1206, 308 may be used to communicate signals with an alternative vehicle system, a repair center, a dispatch center, or the like.

The controller 1004 can include one or more displays 1204 such as a touchscreen, display screen, electronic display, or the like. The displays may visually, graphically, statistically, or the like, display information to the operator of the controller 1004. In one example, the displays 1204 may provide instructions to one or more operators of the controller 1004 and/or one or more operators of the vehicle 1006 that instruct the operators how to inspect or maintain the vehicle 1006. For example, the instructions may communicate to the operator a task to perform (e.g., measure the water pressure of the cooling system), when to perform the task (e.g., after the propulsion subsystem has reached a designated speed), how to perform the task (e.g., read measurements from the first external sensor system 1030A), or the like, in order to determine a condition of the vehicle 1006 (e.g., a condition of the cooling system, a condition of components of the cooling system, or the like). Additionally or alternatively, the controller 1004 may autonomously and/or semi-autonomously (e.g., without operator input) determine a condition of a system of the vehicle (e.g., the condition of the cooling system of the vehicle), a condition of a component of the vehicle (e.g., a heat exchanger of the cooling system), or the like.

The controller 1004 is operably connected with components and/or systems of the vehicle system 1002. Additionally or alternatively, the controller 1004 may be operably connected with components or alternative systems onboard and/or off-board the vehicle system 1002. For example, the controller 1004 may be wirelessly connected with a vehicle repair center in order to autonomously locate a spare part to replace a faulty component of the vehicle 1006, create a work order to have the faulty component replaced, update a status of the vehicle 1006 indicating to an operator of one or more systems that the vehicle 1006 needs repair, or the like.

The controller 1004 can include a power unit 1210. The power unit 1210 powers the controller 1004. For example, the power unit may be a battery and/or circuitry that supplies electrical current to power other components of the controller 1004. Additionally or alternatively, the power unit 1210 may provide electrical power to one or more other systems.

The controller 1004 includes a vehicle selector 1220. The operator of the controller 1004 can activate the vehicle selector 1220 in order to select the vehicle of the vehicle system 1002 from which the controller 1004 would like to obtain sensor information from. For example, the controller 1004 may be operably coupled with the control system 1008 onboard the first vehicle 1006A, however the operator of the controller 1004 may want to obtain status data from the second vehicle 1006B. The operator of the controller 1004 may select the second vehicle 1006B, or one or more additional vehicles of the vehicle system 1002 using the vehicle selector 1220. For example, the command signal communicated by the controller 1004 may instruct the control system 1008 onboard the first vehicle 1006A to request status data from the memory 1112 of the second vehicle 1006B (e.g., via the communication link 1012) in order to receive the status data of the second vehicle 1006B at the control system 1008 of the first vehicle 1006A and communicate the received status data to the controller 1004 (e.g., via the distributed power arrangement communication link 1020).

The controller 1004 is connected with a memory 1226. The memory 1226 can represent a device that electrically and/or magnetically stores data. For example, the memory 1112 may represent a computer hard drive, random access memory, read-only memory, dynamic random access memory, an optical drive, or the like. The memory 1226 stores status data indicative of the state of the vehicle or vehicle system that is obtained by the controller 1004. For example, the memory 1226 may store data indicating a determined condition of the vehicle, condition of one or more systems of the vehicle, condition or one or more components of the vehicle, or the like. For example, the memory 1226 may store the sensor information related to a damaged component in order for an operator to better understand how, why, or when the component was damaged. Additionally or alternatively, the controller 1004 may transfer data between the memory 1226 and an alternative database outside of the controller 1004. For example, the controller 1004 may wirelessly transfer data via the communication unit 1202 from the memory 1226 to a server and/or database at a location away from the vehicle 1006.

The controller 1004 also includes a primary device 1222 and a secondary device 1224. The primary device 1222 can include hardware circuits or circuitry and/or software that includes and/or are connected with one or more processors that perform the operations described herein in connection with the primary device 1222. The primary device 1222 can read the sensor information indicative of the state of the vehicle. For example, the primary device 1222 may be a first data acquisition device and may receive the sensor information of the vehicle 1006 from the memory 1112 onboard the vehicle 1006, where the sensor information is indicative of the state of the vehicle 1006, the state of the systems of the vehicle 1006, the state of components of the systems of the vehicle 1006, or the like. The state of the vehicle may indicate how the vehicle is performing, the health of the vehicle, usage of components and/or systems of the vehicle, or the like. For example, the sensor information may indicate that a radiator shutter is malfunctioning, that the engine oil inlet temperature is outside of a designated threshold temperature, that the coolant fluid volume is outside of a designated threshold volume, or the like. The sensor information may be first sensor information that is obtained from the external sensor systems 1030, the control system sensors 1130, or the like, during a first operation of the vehicle 1006, wherein the first operation of the vehicle 1006 is initiated by the controller 1004 during the inspection event and/or maintenance event of the vehicle 1006. Additionally or alternatively, the sensor information may be first sensor information that is obtained from the memory 1112 that is stored from previous movement of the vehicle (e.g., a previous trip, previous inspection event, previous maintenance event, or the like).

As one example, the primary device 1222 can request temperature measurements of a coolant in a cooling system to determine if a heat exchanger of the cooling system is reducing the temperature of the coolant or if the heat exchanger is not reducing the temperature of the coolant. As another example, the primary device 1222 can request pressure measurements of an air brake system to determine whether an air compressor of the brake system is operating to increase the pressure in the brake system within an upper time limit. As another example, the primary device 1222 can request pressure measurements of a pump within the cooling system of the vehicle to determine if the pressure of coolant that is going into and/or out of the pump is within a designated range.

If the sensor information from the vehicle 1006 is incomplete, or if the controller 1004 is unable to accurately, or within a predetermined threshold, determine the condition of the vehicle 1006, the controller 1004 may rely on the secondary device 1224 in order to accurately, or within a certain threshold, determine the condition of the vehicle 1006. For example, if the first sensor information does not allow the controller 1004 to determine the condition of the vehicle (e.g., condition of the vehicle, systems, components, or the like), the controller 1004 directs the control system 1008 to change operations from a first operation to a different, second operation of the vehicle 1006 by sending a command signal to the control system 1008.

The secondary device 1224 can include hardware circuits or circuitry and/or software that includes and/or are connected with one or more processors that perform the operations described herein in connection with the secondary device 1224. The secondary device 1224 can generate the command signals that are communicated to the control system 1008 that direct the control system 1008 to perform the one or more different, second operations of the vehicle 1006. For example, the secondary device 1224 may be a second data acquisition device and may generate a command signal that instructs the control system 1008 how to initiate one or more operations without changing a configuration setup of the control system 1008. The secondary device 1224 generates the command signals that are communicated to the control system 1008 in order for the controller 1004 to receive the complete status data (e.g., in order to obtain the status data that is lacking) of the vehicle 1006 to determine a condition of the components, systems, or the like of the vehicle 1006 during the inspection event and/or maintenance event.

As one example, the memory 1112, the control system sensors 1130, or the control system 1008 does not have the first sensor information indicative of temperature measurements of the coolant in the cooling system to determine if the heat exchanger of the cooling system is reducing the temperature of the coolant or if the heat exchanger is not reducing the temperature of the coolant. The secondary device 1224 may direct the control system 1008 of the vehicle 1006 to initiate a second operation of the propulsion subsystem 10108 (e.g., change a brake setting, or the like) as the propulsion subsystem 10108 would normally operate during movement or during an operational state/phase other than an inspection state. For example, the secondary device 1224 may direct the vehicle 1006 to move around a railyard in order to check the status of the brakes, the engine, the distributed power arrangement, or the like. The secondary device 1224 may direct the control system 1008 to pump coolant through the cooling system in order to measure the temperature of the coolant. As another example, the control system 1008 does not have pressure measurements of the air brake system to determine if the air brake system is operating to increase the pressure in the brake system. The secondary device 1224 may instruct the control system 1008 to apply the air brakes in order to obtain second sensor information from the external sensor systems 1030 and/or the control system sensors 1130 that is indicative of the time it takes for the air pressure within the air brake system to increase.

The secondary device 1224 directs the control system 1008 to perform an operation (e.g., a second operation) to obtain second sensor information when the control system 1008 does not have the first sensor information. The different, second operation of the vehicle that the secondary device 1224 instructs the control system 1008 to perform is an operation that the vehicle 1006 only performs during movement of the vehicle. For example, during a typical inspection event, individual systems and/or components may be inspected, and the individual systems and/or components may be forced into operation. For example, the air brakes may be engaged or disengaged, the cooling system may be pressurized or depressurized, electrical wiring may be tested, the radiator cap may be visually checked for defects, or the like. Alternatively, the controller 1004 directs the control system 1008 to initiate operations of the vehicle as the vehicle would operate during normal operation in order to obtain sensor information when the systems and components of the vehicle 1006 work together. In one example, the electrical wiring may be tested by individually controlling electrical contacts in order to determine a power ground circuit.

The controller 1004 instructs the vehicle 1006 to perform operations without the vehicle 1006 being aware that the vehicle 1006 is being inspected and/or maintained. For example, the secondary device 1224 may instruct the propulsion subsystem 10108 to operate at a throttle setting (e.g., a speed that mimics a speed the vehicle would normally travel at during movement up an increasing terrain along a route), and subsequently direct the propulsion subsystem 10108 to increase a brake setting (e.g., a brake setting that mimics a setting the vehicle would normally apply at a decreasing terrain along the route). By instructing the vehicle to perform operations that the vehicle would perform during normal operation of the vehicle, the controller 1004 may obtain sensor information indicating the state of the vehicle when the vehicle systems and/or components function together. For example, information regarding the discharge of air from the air brakes as well as information around the air compressor operating conditions can be collected as sensor information indicative of a state of the braking system, the air compressor, the air conduits, or the like.

In the illustrated embodiment of FIG. 12, the primary device 1222 and the secondary device 1224 are shown as being connected with the controller 1004. Optionally, one or more of the primary device 1222 or the secondary device 1224 may be transferably coupled with the controller 1004. Additionally or alternatively, the controller 1004 may include the primary device 1222 and may not include the secondary device 1224. For example, the secondary device 1224 may be coupled to the control system 1008 of the vehicle and wirelessly communicate with the controller 1004.

Additionally or alternatively, in one or more embodiments, the primary device 1222 may be unable to obtain the requested status information if the control system 1008 is not equipped with the correct control system sensors 1130. For example, the vehicle 1006 may not be equipped with a coolant temperature sensor, a manifold absolute pressure sensor, an air flow meter, or an alternative sensing device configured to indicate the state of the vehicle 1006 and/or the state of one or more components and/or systems of the vehicle 1006. One or more external sensor systems 1030 may be selectively coupled with the vehicle 1006 in order for the controller 1004 to obtain sensor information from the external sensor systems 1030 indicating the state of the vehicle 1006, the state of components of the vehicle 1006, the state of the systems of the vehicle 1006, or the like.

Additionally or alternatively, in one or more embodiments, a maintenance tool (not shown) may be coupled with the controller 1004 during a maintenance event for the vehicle 1006, for a sensor of the vehicle 1006, for the control system 1008, or the like. For example, the maintenance tool may be a cleaning device, such as a pressure washer, that is coupled with the controller 1004. The controller 1004 may autonomously or semi-autonomously direct the cleaning device to operate when the vehicle 1006 is stationary, until a cleaning process is complete, until the controller 1004 confirms that the cleaning operation is complete, for a designated length of time, or the like. Optionally, the maintenance tool may be any alternative device that receives instructions from the controller 1004 to perform an operation in accordance with the received instructions, for example, to assist with the vehicle inspection event.

Returning to FIG. 10, the controller 1004 is configured to obtain sensor information of the vehicle 1006 by sending command signals to the control system 1008 onboard the vehicle 1006. The command signals may be one or more of requests for sensor information, instructions for the control system 1008 to initiate an operation by the vehicle 1006, or the like. For example, the controller 1004 is configured to control or stimulate movement of the vehicle 1006 by instructing the control system 1008 to initiate one or more operations of the vehicle, wherein the one or more operations are one or more operations performed by the control system 1008 during movement of the vehicle 1006 prior to and/or subsequent to an inspection event of the vehicle 1006 by the controller 1004. For example, the command signals may instruct the control system 1008 to operate at a throttle setting that mimics a throttle setting of the vehicle 1006 during a trip (e.g., before or after an inspection event).

The one or more processors of the controller 1004 allows for inspection and/or maintenance of the vehicle 1006 when the control system 1008 lacks the sensor information indicative of the state of the vehicle 1006. The secondary device 1224 manipulates the vehicle 1006 into performing an operation that results in the sought sensor information data being generated. For example, the secondary device 1224 sends command signals to the control system 1008 directing the vehicle 1006 to perform one or more operations that simulates real-world operations of the vehicle system 1002. The controller 1004 obtains the sought sensor information that is generated to autonomously or semi-autonomously determine a condition of one or more components, one or more systems, or a combination therein, of the vehicle 1006. For example, the controller 1004 determines a condition of the vehicle indicative that may be an operational state, a fault state, a damaged state, or the like, of one or more components and/or systems of the vehicle 1006.

Figure 13:
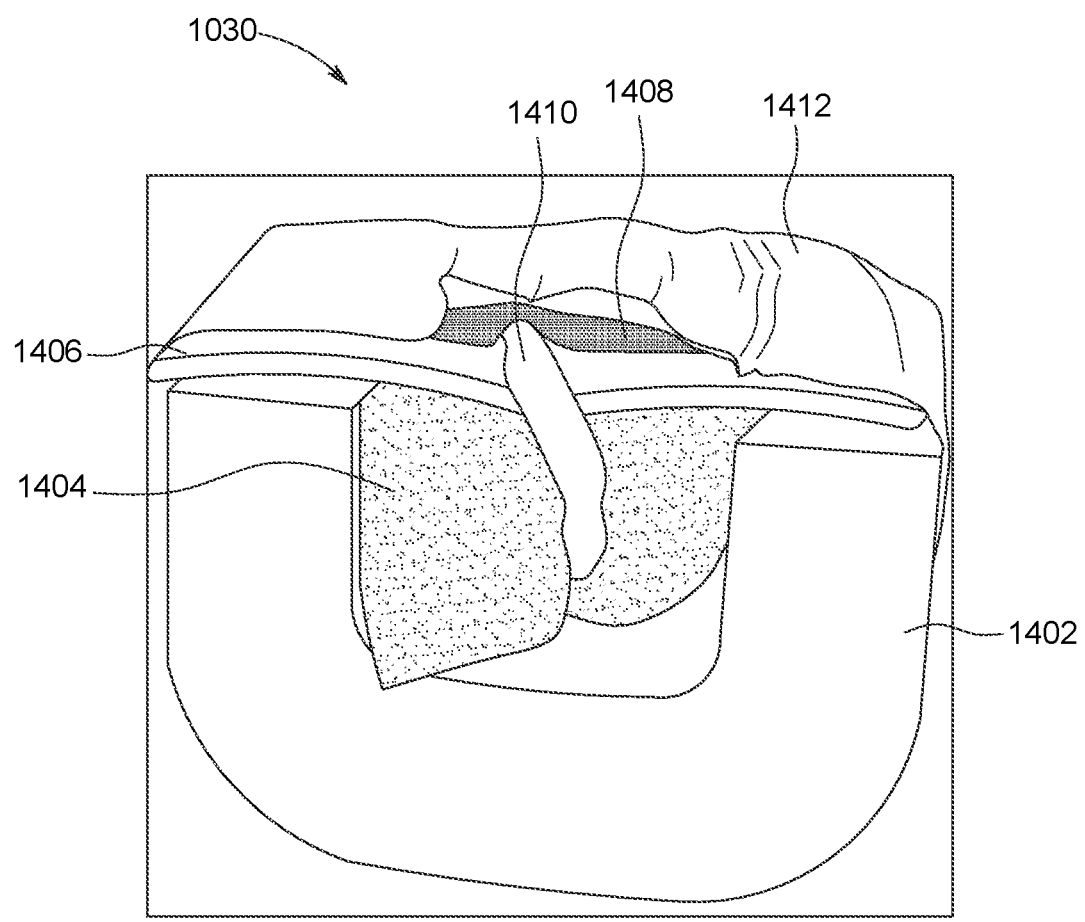
FIG. 13 illustrates a schematic illustration of a sensor system in accordance with one embodiment.
Figure 14:
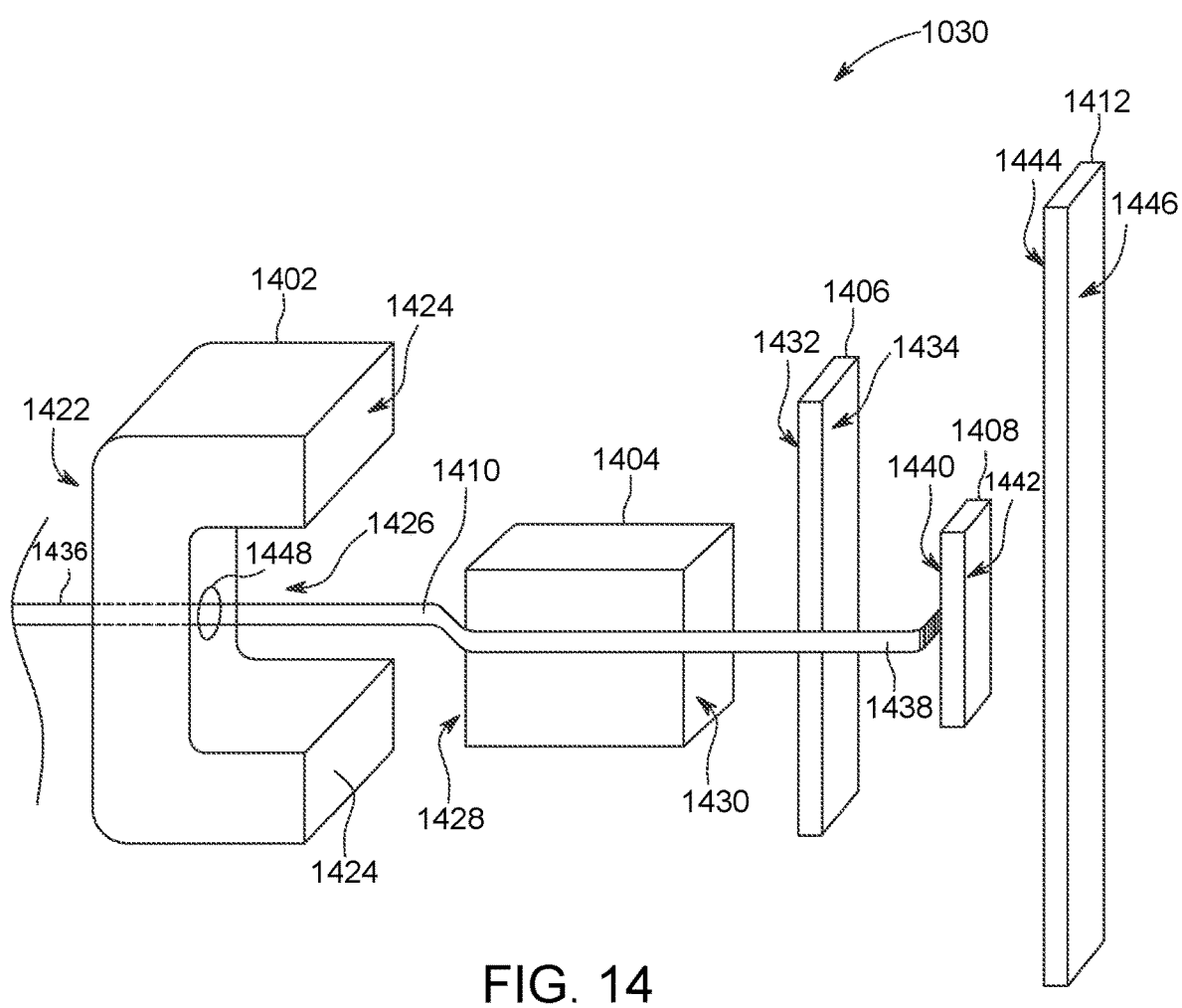
FIG. 14 illustrates an exploded illustration of the sensor system of FIG. 13 in accordance with one embodiment.

FIG. 13 illustrates a schematic illustration of one example of the external sensor system 1030 of FIG. 10 in accordance with one embodiment. FIG. 14 illustrates an exploded illustration of the external sensor system 1030 in accordance with one embodiment. FIGS. 4 and 5 will be discussed in detail together. In the illustrated embodiment, the external sensor system 1030 is a sensor that is used to measure a temperature of one or more components, systems, or the like, of the vehicle 1006. Additionally or alternatively, the external sensor system 1030 may be any alternative sensor used to sense alternative information (e.g., pressures, flow rates, vibrations, visual information, audio information, or the like).

The external sensor system 1030 may be used to read one or more surface temperatures of the vehicle 1006 and/or a temperature inside of the surfaces of the vehicle 1006. For example, the external sensor system 1030 may be used to read the engine oil temperature, coolant temperature, or the like, of the vehicle 1006. Optionally, the external sensor system 1030 may be used to read the ambient temperature of the vehicle 1006. Optionally, the external sensor system 1030 may be used to read an alternative temperature. Additionally or alternatively, the external sensor system 1030 may be an alternative sensor used to sense one or more characteristics of the vehicle 1006, one or more characteristics of the environment of the vehicle 1006, or any combination therein. For example, the external sensor system 1030 may be used to determine an externality characteristic of the external sensor system 1030 that may be indicative of one or more external conditions to which the external sensor system 1030 is exposed. Additionally or alternatively, the externality characteristic may indicate one or more external conditions to which the vehicle 1006 is exposed. The externality characteristics may include an ambient temperature, an ambient humidity, an ambient barometric pressure, or the like.

The external sensor system 1030 has a magnet 1402 that is used to maintain a position of the external sensor system 1030 at a location of the vehicle 1006. For example, the magnet may keep the external sensor system 1030 pressed against a curved metal pipe, a flat metal surface, wall, or the like, of the vehicle 1006. The magnet 1402 has a first side 1422, second sides 1424, and a gap 1426 between the second sides 1424. In the illustrated embodiment, the magnetic 1402 is generally C-shaped. Alternatively, the magnet 1402 may have any alternative shape and/or size. Additionally or alternatively, the external sensor system 1030 may use an alternative method and/or material to maintain a position at a location. For example, the sensor system 1030 may be adhered to a surface with an adhesive material.

The external sensor system 1030 has a first support layer 1404 and a second support layer 1406. The first support layer 1404 is sized and/or shaped in order to be positioned inside of the gap 1426 of the magnet 1402 when the external sensor system 1030 is assembled. For example, the first support layer 1404 may be manufactured of a flexible or rigid material such as foam, or the like. A first side 1428 of the first support layer 1404 is received into the gap 1426 of the magnet 1402. The first support layer 1404 is essentially cubed in shape and is sized and/or shaped in order to substantially fill the gap 1426. Alternatively, the first support layer 1404 may have any alternative shape and/or size. Optionally, the external sensor system 1030 may be devoid of the first support layer 1404. For example, the magnet 1402 may have an alternative shape that is devoid the gap 1426, and the system 1030 may be devoid the first support layer 1404 that substantially fills the gap 1426.

The second support layer 1406 is sized and/shaped in order to be positioned on the second sides 1424 of the magnet 1402. The second support layer 1406 has a rectangular cross-sectional shape and is manufactured of a flexible material, a rigid material, or any alternative material. For example, in the illustrated embodiment, the second support layer 1406 is a strengthened foam material, such as Styrofoam, having a first side 1432 and a second side 1434. The first side 1432 that is operably coupled to a second side 1430 of the first support layer 1404 and operably coupled to the second sides 1424 of the magnet 1402. For example, the first side 1432 of the second support layer 1406 may be pressed up against the second side 1430 of the first support layer 1404. The first support layer 1404 provides support for the second support layer 1406 at the gap 1426 when the external sensor system 1030 is assembled. For example, the first support layer 1404 may prevent the second support layer 1406 from curving, bending, or the like, into the gap 1426 when the external sensor system 1030 is assembled, when the sensor system 1030 is mounted to a surface of the vehicle 1006, or the like. The first support layer 1404 enables the second support layer 1406 to remain positioned essentially flat between the second sides 1424 of the magnet 1402.

The system 1030 includes a temperature sensor 1410 that reads the temperature of the surface that the system 1030 is operably coupled to. For example, the temperature sensor 1410 may be a thermistor, a resistance temperature detector, a heat flux sensor, a temperature gauge, a thermocouple, or the like. A first end 1438 of the temperature sensor 1410 is disposed between a thermal conductive layer 1408 and the second support layer 1406. The thermal conductive layer 1408 transfers heat from the surface that the external sensor system 1030 is operably coupled with to the sensor 1410, and the second support layer 1406 isolates (e.g., thermally, physically, or the like) the first end 1438 of the sensor 1410 from the magnet 1402, convection to ambient air, or the like. A second end 1436 of the temperature sensor 1410 extends a distance away from the thermal conductive layer 1408 and through a passage 1448 of the magnet 1402. For example, the second end 1436 extends a distance away from the system 1030 in order to be operably coupled to the control system 1008, the controller 1004, an alternative sensor reader, or the like.

The thermal conductive layer 1408 that has a first side 1440 that is coupled to the second side 1434 of the second support layer 1406 when the sensor system 1030 is assembled. For example, the thermal conductive layer 1408 may be a thermal pad that transfers heat from the surface that the external sensor system 1030 is operably coupled with to pass through the thermal conductive layer 1408 to the first end 1438 of the sensor 1410.

The first support layer 1404, the second support layer 1406, the thermal conductive layer 1408 and the temperature sensor 1410 may be held in an assembled position with the magnet 1402 with one or more conductive adhesive layers 1412. For example, the conductive adhesive layer 1412 may be one or more pieces of a conductive tape with an adhesive side 1444 and a non-adhesive side 1446. The adhesive side 1444 of the conductive adhesive layer 1412 is adhered to the magnet 1402 in order to assemble the external sensor system 1030. The conductive adhesive layer 1412 may enable heat to be transferred from the surface to which the external sensor system 1030 is coupled to, to the temperature sensor 1410.

Figure 15:
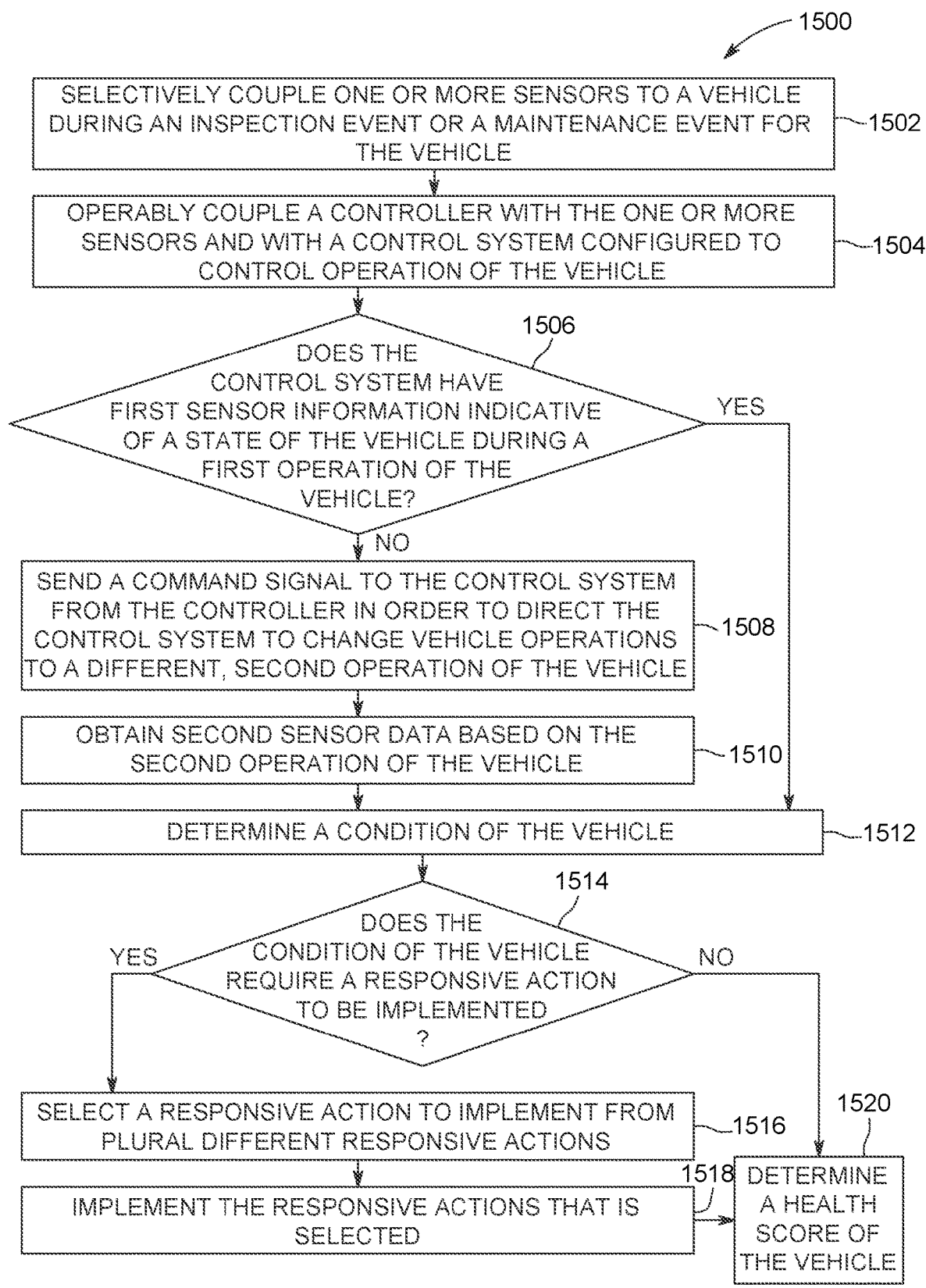
FIG. 15 illustrates a flowchart of a method for determining a fault state of a vehicle in accordance with one embodiment.

FIG. 15 illustrates a flowchart of a method 1500 for inspecting and/or maintaining a vehicle with the inspection system 100 in accordance with one embodiment. At 1502, one or more sensors are selectively coupled to a vehicle during an inspection event and/or a maintenance for a vehicle 1006. For example, one or more external sensor systems 1030 may be transferably coupled to the vehicle 1006 to inspect the vehicle 1006. At 1504, the controller 1004 is operably coupled with the control system 1008 that controls operations of the vehicle 1006, and is operably coupled with the one or more sensors. The controller 1004 is operably coupled with the control system 1008 in order to cause the control system 1008 to initiate one or more operations of the vehicle 1006 during the inspection event and/or maintenance event. Additionally, the controller 1004 is operably coupled the control system sensors 1130 and the one or more external sensor systems 1030 in order to obtain sensor information indicative of a state of the vehicle 1006.

At 1506, a decision is made by the controller 1004 to determine if the control system 1008 has first sensor information indicative of a state of the vehicle during a first operation of the vehicle 1006. For example, the vehicle 1006 may have over-heated and the vehicle 1006 is transferred to a repair center. The controller 1004 may request first sensor information from the memory 1112 of the control system 1008, from the control system sensors 1130, from the external sensor systems 1030, or any combination of one or more of therein, that is indicative of the state of the vehicle 1006, for example, when the vehicle 1006 overheated. For example, the controller 1004 may request sensor information of the first operation of the vehicle 1006. The first operation of the vehicle 1006 may be to bring engine speed of the vehicle 1006 to a first throttle setting in order to gather information that includes radiator shutter functionality, radiator cooling fan functionality, coolant flow rates, engine oil temperature measurements, engine coolant temperature measurements, engine lube temperature measurements, or the like, during the first operation of the vehicle 1006. The first sensor information may be in the form of numerical data, graphical data, statistical data, pass/fail indicator, or the like. Optionally, the first sensor information may include current and/or stored operational data associated with the vehicle system 1002. For example, the first sensor information may include operational data and/or maintenance data of the radiator shutter stored in the memory 1112. If the controller 1004 determines that the control system 1008 does have the first sensor information indicative of the state of the vehicle 1006, then flow of the method proceeds towards 1512. Alternatively, if the controller 1004 determines that the control system 1008 does not have the first sensor information indicative of the state of the vehicle 1006, then flow of the method proceeds towards 1508.

Additionally or alternatively, in one or more embodiments the controller 1004 may determine if the control system 1008 of the first and second vehicles 1006A, 160B have the first sensor data. For example, the controller 1004 may be operably coupled with the control system 1008 of the first vehicle 1006A, and may request sensor information from both the first and second vehicles 1006A, 1006B in order to determine a condition of one or more of the first or second vehicles 1006A, 1006B and/or of the vehicle system 1002. The control system 1008 of the first vehicle 1006A may operate using the distributed power configuration of the vehicle system 1002 (of FIG. 10) to communicate the request signal to the second vehicle 1006B via the communication link 1012.

At 1508, the controller 1004 sends a command signal to the control system 1008 from the controller 1004 in order to direct the control system 1008 to change vehicle operations from the first operation to a different, second operation. For example, the first sensor information that is sensed during the first operation of the vehicle 1006 may not indicate the condition of the vehicle 1006. The secondary device 1224 of the controller 1004 may send a command signal to the control system 1008 instructing the control system 1008 to operate at a second operation. For example, the second operation may be to bring the engine speed of the vehicle 1006 to a second throttle setting that is greater than the first throttle setting, in order to gather second sensor information that includes radiator shutter functionality, radiator cooling fan functionality, coolant flow rates, engine oil temperature measurements, engine coolant temperature measurements, engine lube temperature measurements, or the like, during the second operation of the vehicle 1006. For example, the controller 1004 may instruct the control system 1008 to change one or more operations of components or systems of the vehicle 1006 that force the components or systems to change, relative to waiting for the components or systems to change independently. The controller 1004 may instruct the control system 1008 to initiate one or more operations that are performed by the control system 1008 during movement of the vehicle 1006. For example, the command signals from the controller 1004 may instruct the control system 1008 to operate as it would operate (e.g. normal and/or typical throttle settings, brake settings, speed settings, radiator fan speeds, pump speeds, coolant flow rates, or the like) prior to and/or subsequent to the controller 1004 determining a condition of the vehicle. For example, the control system 1008 may instruct the propulsion subsystem 10108 to operate at full power, to operate at varying intervals of increasing and/or decreasing power, to operate at full power then increase the brake setting (e.g., settings that mimic normal or typical operations of the vehicle traveling along the route).

Additionally, by instructing the control system 1008 to perform one or more operations with the vehicle 1006 that are normal and/or typical operations of the vehicle 1006, the controller 1004 does not change a configuration setup of the control system 1008. For example, the controller 1004 may instruct the control system 1008 to initiate an operation such that the performed operation does not require the control system 1008 to change a configuration or setup between the control system 1008 and the propulsion subsystem 10108, the energy management system 1117, or any other system.

Additionally or alternatively, the controller 1004 may not be able to instruct the control system 1008 to perform one or more operations. For example, the vehicle 1006 may be an old vehicle model with a control system 1008 that that is not compatible with and/or cannot receive all command signals from the controller 1004. An operator of the vehicle 1006 and/or the controller 1004 may instruct the vehicle 1006 to perform one or more operations with the vehicle 1006 in order for the controller 1004 to obtain the sensor information of the vehicle 1006.

Additionally or alternatively, in one or more embodiments, the controller 1004 may send a command signal to the control system 1008 of the first vehicle 1006A instructing the control system 1008 of the second vehicle 1006B to perform one or more operations. For example, the control system 1008 of the first vehicle 1006A may utilize the distributed power configuration of the vehicle system 1002 (of FIG. 10) to communicate the command signal to the second vehicle 1006B via the communication link 1012 in order for the controller 1004 to determine a condition of the second vehicle 1006B.

At 1510, the controller 1004 obtains the second sensor information based on the second operation of the vehicle 1006. For example, the controller 1004 may obtain the second sensor information from one or more of the external sensor system 1030, the control system sensors 1130, or the memory 1112. The control system 1008 communicates the second sensor information based on the performed second operations of the vehicle 1006 to the controller 1004 (e.g., via the communication link 1020).

At 1512, the controller 1004 determines a condition of the vehicle 1006, a condition of one or more components of the vehicle 1006, or a condition of one or more systems of the vehicle, based on the first and second sensor information that is indicative of an operational state, a fault state, a damaged state, of the components and/or systems of the vehicle. The fault state may be indicative of one or more of a faulty system of a faulty component; the damaged state may be indicative of a level of damage to a system or a component; the operational state may be indicative of the functionality of a system or a component. For example, the controller 1004 may determine that the radiator shutters do not actuate when the engine speed exceeds a determined limit; may determine that the air compressor of the brake system fails to increase the pressure of in the brake system within a minimum time limit; may determine that the heat exchanger does not reduce the temperature of the coolant in the cooling system to a designated temperature; may determine that the radiator cooling fan operates only when the temperature of the cooling system is below a determined temperature; may determine that the water tank of the cooling system leaks water; may determine that the oil pressure drop across a lube oil cooler and filter exceeds a designated pressure threshold; or the like.

In one embodiment, the controller 1004 determines a condition and diagnoses an operational state of the vehicle 1006 based on one or more of the operating characteristic of the vehicle determined by a first sensor, on the externality characteristic of the first sensor determined by a second sensor, or on the externality characteristic of the vehicle 1006 determined by the second sensor. For example, the control system sensors 1130 may have the sensor information indicative of the operating characteristic of the vehicle 1006. The control system sensors 1130 (e.g., a cooling system temperature sensor) may determine that the heat exchanger is not reducing the temperature of the coolant in the cooling system of the vehicle 1006. The external sensor systems 1030 may determine one or more externality characteristics representative of one or more external conditions to which the control system sensors 1130 are exposed. For example, the external sensor systems 1030 may determine that the control system sensors 1130 are disposed at a location onboard the vehicle 1006 that is hotter relative to alternative locations onboard the vehicle 1006. For example, the external sensor systems 1030 may determine that the control system sensors 1130 are disposed near the engine exhaust conduit which may have a higher temperature than the engine coolant inlet conduit. Additionally or alternatively, the external sensor system 1030 may determine one or more externality characteristics representative of one or more external conditions to which the vehicle 1006 is exposed. For example, the external sensor systems 1030 may determine that the vehicle 1006 is being inspected and/or maintained at a first repair center that has a higher humidity relative to a different, second repair center. For example, the vehicle 1006 may be inspected at a location in Florida that has a greater ambient humidity level than a repair center located in Colorado. The externality conditions of the vehicle and the sensors may impact the operational characteristic of the vehicle 1006. For example, an operating vehicle 1006 exposed to a higher ambient temperature may overheat more quickly relative to an operating vehicle 1006 exposed to a lower ambient temperature; a vehicle exposed to a higher ambient humidity may cause the electric wiring to short more easily relative to a vehicle exposed to a lower ambient humidity. Optionally, the first external sensor system 1030A may determine the externality characteristics of the control system sensors 1130 and/or the vehicle 1006 when the vehicle 1006 is operating at a first geographical location, and alternatively the second external sensor system 1030B may determine the externality characteristics of the control system sensors 1130 and/or the vehicle 1006 when the vehicle 1006 is operating at a second geographical location.

At 1514, a decision is made if the determined condition of the vehicle 1006 requires a responsive action to be implemented. For example, the controller 1004 may determine whether or not to implement a responsive action in response to determining that the radiator shutter is failing to actuate, in response to the radiator cooling fan operating only when the temperature of the cooling system is below a determined temperature, in response to determining that the water tank of the cooling system has a leak, or the like. If a responsive action is required, then flow of the method proceeds towards 1516. If a responsive action is not required (e.g., a component and/or system does not need to be repaired, replaced, inspected further, or the like), then flow of the method proceeds towards 1520.

At 1516, a responsive action from plural different response actions is selected to be implemented. For example, if the controller 1004 has determined a condition of the components and/or systems of the vehicle 1006 based on the first and second sensor information, then a responsive action may be selected in order to repair, correct, fix, improve the fault state, improve the state of health, or the like, of one or more components the vehicle 1006. The plural different responsive actions may include one or more of scheduling routine maintenance of the vehicle, scheduling non-routine maintenance (e.g., immediate) of the vehicle, not taking any responsive action, repair or replace a damaged or worn component of the vehicle, repair or replace a damaged system of the vehicle, generate a work order for maintenance in order to repair or replace the component and/or system, notify the operator of the vehicle system 1002 that the controller 1004 has identified a condition of the system or component that requires a responsive action, update a status of the vehicle 1006 indicating to one or more operators or other vehicles the condition of the vehicle 1006, store the first and second sensor information in the memory 1226 of the controller 1004, store the determined faulty state (e.g., the faulty component, faulty system, or the like) in the memory 1226 of the controller 1004, schedule a cleaning operation in order to clean a component, the vehicle 1006 and/or vehicle system using the cleaning device, or the like. Additionally or alternatively, the selected responsive action may be any alternative responsive action.

At 1518, the responsive action that is selected from the plural different responsive actions is implemented. For example, if the controller 1004 has determined that the vehicle 1006 has a damaged radiator shutter, then the controller 1004 may autonomously and/or semi-autonomously generate a work order identifying the damaged radiator shutter and schedule non-routine maintenance (e.g., immediate) of the vehicle 1006 in order to replace the damaged radiator shutter. Additionally or alternatively, if the controller 1004 has determined that the vehicle 1006 has a measured volume of coolant that is below a designated threshold (e.g., the engine is overheating), then the controller 1004 may autonomously or semi-autonomously generate a work order with instructions to add coolant to the cooling system of the vehicle 1006.

At 1520, the controller 1004 determines a health score of the vehicle 1006 based on the determined condition of the vehicle, the components, or the systems of the vehicle. For example, the controller 1004 may determine that the vehicle 1006 has a low health score (e.g., the vehicle is in poor health) if the difference between the first and second sensor information and predetermined target values of sensor information is high (e.g., above or greater than a designated threshold). For example, the sensor information may indicate that the volume of coolant flowing through the cooling system is low, however the measured volume of coolant flowing through the cooling system is a value greater than a predetermined target volume of coolant (e.g., not a fault state). Then the controller 1004 may indicate that the health score of the cooling system of the vehicle 1006 is low. Alternatively, if the measured volume of coolant flowing through the cooling system is high (e.g., is a measured value generally close to the predetermined target volume value), then the controller 1004 may indicate that the health score of the cooling system of the vehicle 1006 is high (e.g., the vehicle is in good health). In another example, the controller 1004 has determined that a radiator shutter is damaged. The controller 1004 may indicate that the health score of the cooling system of the vehicle 1006 is low (e.g., the vehicle is in poor health) in response to the determined damaged radiator shutter.

In one or more embodiments, the controller 1004 is coupled with the first vehicle 1006A in order to diagnose a state of health of the first vehicle 1006A. The controller 1004 may be subsequently transferred off-board the first vehicle 1006A and onboard the second vehicle 1006B and coupled with the control system 1008 that is onboard the second vehicle 1006B in order to determine a condition of the second vehicle 1006B. For example, the controller 1004, when onboard the first vehicle 1006A, may instruct the control system 1008 of the first vehicle 1006A to perform a first set of operations, and may autonomously diagnose a first condition (e.g., a malfunctioning radiator shutter) of the first vehicle 1006A. The controller 1004, when onboard the second vehicle 1006B, may instruct the control system 1008 of the second vehicle 1006B to perform a second set of operations, wherein the second set of operations may be unique or the same as the first set of operations instructed to the first vehicle 1006A. Additionally, the controller 1004 may autonomously diagnose a second condition (e.g., engine coolant volumes are too low, or are below a designated threshold) of the second vehicle 1006B. Alternatively, the second condition may be the same as the first condition of the first vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to those of ordinary skill in the art upon reviewing the above description. As used herein, the terms "including" and "in which" are used as the plain-English equivalents of the respective terms "comprising" and "wherein." Moreover, terms such as "first," "second," "third," "upper," "lower," "bottom," "top," etc. are used merely as labels, and are not intended to impose numerical or positional requirements on their objects.

This written description uses examples to disclose several embodiments of the inventive subject matter, including the best mode, and also to enable one of ordinary skill in the art to practice the embodiments of inventive subject matter, including making and using any devices or systems and performing any incorporated methods.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A vehicle engine control system comprising:
one or more processors configured to monitor a fuel quantity injected into multiple cylinders of an engine before and after communication of an overfuel control signal, wherein the overfuel control signal commands a first fuel supply device to supply excess fuel into a first cylinder of the engine; and
responsive to the fuel quantity that is monitored not decreasing during a designated time period after the communication of the overfuel control signal, the one or more processors are configured to one or both of determine that the first fuel supply device is defective or generate a control signal indicative of the first fuel supply device being defective.

2. The vehicle engine control system of claim 1, wherein the one or more processors indirectly monitor the fuel quantity injected into the multiple cylinders based on a measured injection duration of fuel supply devices configured to supply fuel into the multiple cylinders, wherein the injection duration represents a time during which the fuel supply devices are in an open state to inject fuel into the multiple cylinders.

3. The vehicle engine control system of claim 1, wherein the excess fuel according to the overfuel control signal is greater than an amount of fuel that can be combusted within the first cylinder during a single combustion cycle of the first cylinder.

4. The vehicle engine control system of claim 1, wherein the one or more processors are configured to generate the control signal to schedule maintenance to repair or replace the first fuel supply device.

5. The vehicle engine control system of claim 1, wherein the one or more processors are configured to generate the control signal to alert an operator that the first fuel supply device is defective.

6. The vehicle engine control system of claim 1, wherein the one or more processors are configured to determine that the first fuel supply device is defective in response to the fuel quantity that is monitored not decreasing by more than a designated noise threshold after the communication of the overfuel control signal, wherein the designated noise threshold is a non-zero threshold.

7. The vehicle engine control system of claim 1, wherein the first fuel supply device includes one or more of a fuel injector, a fuel pump, or a fuel line.

8. The vehicle engine control system of claim 1, wherein the fuel quantity injected into the multiple cylinders that is monitored by the one or more processors does not include a fuel quantity injected into the first cylinder.

9. The vehicle engine control system of claim 1, wherein the one or more processors are configured to communicate the overfuel control signal to the first fuel supply device.

10. The vehicle engine control system of claim 1, wherein, responsive to the fuel quantity injected into the multiple cylinders decreasing after the communication of the overfuel control signal, the one or more processors are configured to determine that the first fuel supply device is properly functioning.

11. The vehicle engine control system of claim 1, wherein the one or more processors are configured to receive an alternating current (AC) input and convert the AC input into a regulated DC output that is supplied to a field coil of an alternator,
wherein the one or more processors are configured to control the vehicle to a designated operational state, the designated operational state being designated for diagnosing or testing the alternator and field current controller,
wherein the one or more processors are configured to monitor at least one operating parameter of the field current controller and compare a monitored value of the at least one operating parameter to a threshold range responsive to the vehicle operating in the designated operational state, and
wherein the at least one operating parameter is a field current controller duty-cycle of the field current controller in operation when the vehicle is operating in the designated operational state.

12. The vehicle engine control system of claim 1, further comprising:
one or more sensors that are selectively coupled to the vehicle during one or more of an inspection event or a maintenance event for the vehicle,
wherein the one or more processors are configured to initiate a first operation and a different, second operation of the plural operations of the vehicle,
wherein the one or more processors are configured to:
determine whether the one or more processors have first sensor information indicative of a state of the vehicle during the first operation of the vehicle;
send a command signal to direct the vehicle to change operations from the first operation to the second operation of the vehicle responsive to determining that the one or more processors lack the first sensor information that was requested;
obtain second sensor information from the one or more sensors based on the second operation of the vehicle; and
determine a condition of one or more components of the vehicle based on the first sensor information and the second sensor information.

13. A vehicle engine control system comprising:
an engine onboard a vehicle and having plural fuel supply devices configured to supply fuel into different corresponding cylinders of the engine; and
one or more processors operably connected to the fuel supply devices, the one or more processors configured to communicate an overfuel control signal to determine whether a first fuel supply device of the fuel supply devices corresponding to a first cylinder of the cylinders is properly functioning, wherein the overfuel control signal commands the first fuel supply device to supply excess fuel into the first cylinder;
wherein the one or more processors are configured to monitor a fuel quantity injected into the cylinders of the engine other than the first cylinder before and after communication of the overfuel control signal; and
wherein the one or more processors are configured, responsive to the fuel quantity that is monitored not decreasing during a designated time period after the communication of the overfuel control signal, to generate one or more control signals indicative of the first fuel supply device being defective.

14. A method for controlling operation of an engine of a vehicle, the method comprising:

monitoring, via one or more processors, a fuel quantity injected into at least a second cylinder of the engine before and after communication of an overfuel control signal, wherein the overfuel control signal commands a first fuel supply device to supply excess fuel into a first cylinder of the engine; and responsive to the fuel quantity that is monitored not decreasing during a designated time period after the communication of the overfuel control signal, determining that the first fuel supply device is defective.

15. The method of claim 14, further comprising measuring an injection duration of one or more fuel supply devices configured to supply fuel into the at least second cylinder, the injection duration representing a time that the one or more fuel supply devices are in an open state to inject fuel into the at least second cylinder, wherein the method further comprises indirectly monitoring the fuel quantity injected into the at least second cylinder based on the injection duration.

16. The method of claim 15, wherein the first fuel supply device is determined to be defective in response to the injection duration of the one or more fuel supply devices configured to supply fuel into the at least second cylinder remaining within a designated noise threshold of the injection duration after the communication of the overfuel control signal relative to the injection duration prior to the communication of the overfuel control signal.

17. The method of claim 14, further comprising generating a control signal to schedule maintenance to repair or replace the first fuel supply device responsive to determining that the first fuel supply device is defective.

18. The method of claim 14, further comprising generating a control signal to alert an operator that the first fuel supply device is defective responsive to determining that the first fuel supply device is defective.

19. The method of claim 14, wherein, responsive to the fuel quantity injected into the at least second cylinder decreasing after the communication of the overfuel control signal, the method includes determining that the first fuel supply device is properly functioning.

20. The method of claim 14, further comprising communicating, via the one or more processors, the overfuel control signal to the first fuel supply device.

* * * * *